United States Patent
Chisaka

(10) Patent No.: US 7,461,093 B2
(45) Date of Patent: Dec. 2, 2008

(54) NETWORK CONNECTING DEVICE, SERVER DEVICE, TERMINAL DEVICE, SYSTEM, RECEIVING METHOD, CHARACTER INPUT METHOD, TRANSMISSION METHOD, PROGRAM, AND COMPUTER-READABLE STORAGE MEDIUM

(75) Inventor: Masanobu Chisaka, Chiba (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 330 days.

(21) Appl. No.: 11/231,808

(22) Filed: Sep. 22, 2005

(65) Prior Publication Data

US 2007/0061299 A1     Mar. 15, 2007

Related U.S. Application Data

(60) Provisional application No. 60/715,568, filed on Sep. 12, 2005.

(51) Int. Cl.
  *G06F 17/00*   (2006.01)
(52) U.S. Cl. .................... 707/104.1; 707/101; 707/102; 707/103 R
(58) Field of Classification Search ............... 707/1–10, 707/100–104.1, 200–206
  See application file for complete search history.

(56) References Cited

U.S. PATENT DOCUMENTS

| 6,081,830 | A | 6/2000 | Schindler |
| 2004/0019909 | A1* | 1/2004 | Takahashi .................... 725/58 |
| 2006/0116869 | A1 | 6/2006 | Kimura et al. |

FOREIGN PATENT DOCUMENTS

| JP | 8-287155 A | 11/1996 |
| JP | 10-69496 A | 3/1998 |
| JP | 2001-520426 A | 10/2001 |
| JP | 2002-290996 A | 10/2002 |
| JP | 2004-062639 A | 2/2004 |
| JP | 2005-184613 A | 7/2005 |
| WO | WO-99/20026 A1 | 4/1999 |

* cited by examiner

*Primary Examiner*—Isaac M Woo
(74) *Attorney, Agent, or Firm*—Birch, Stewart, Kolasch & Birch, LLP

(57) ABSTRACT

In a mobile phone, service searching means extracts a keyword(s) from program information regarding the program currently reproduced in the mobile phone, and searches a service registration database for all titles and addresses of message exchange system associated with the keyword(s). Menu displaying means displays a list of the acquired title(s) in a display. Further, the service searching means 53 receives data for causing the mobile phone to function as a terminal device of the message exchange system selected by the user, allowing the user to immediately access the message exchange system.

9 Claims, 24 Drawing Sheets

FIG. 5

```
station: TVSテレビ
year: 2005
month: 07
date: 21
start: 20:00
end: 20:54
program-title: うたばんぐみ
program-subtitle:「人気歌手が総出演」
genre: 32
subgenre: 6
Extend: 0

「S」大ヒットカツケンサンバに続く真山
茂男新キャラ誕生▽小塚愛にフラれた
男スタジオ乱入…彼氏はあの芸人？
```

FIG. 8 (a)

| Label | String |
|---|---|
| CHARACTER STRING CONTAINED EPG DATA | /金曜映画ショー　「ゴースト：ロンドンの幻」/ |
| CHARACTER STRING RESULTING FROM S1 | /金曜映画ショー　「ゴースト：ロンドンの幻」/ |
| CHARACTER STRING RESULTING FROM S2 | /金曜映画ショー■「ゴースト：ロンドンの幻」/ |
| CHARACTER STRING RESULTING FROM S3 | /金曜映画ショー/「ゴースト：ロンドンの幻」/ |
| CHARACTER STRING RESULTING FROM S4 | /金曜映画ショー/ゴースト/ロンドンの幻/ |
| CHARACTER STRING RESULTING FROM S5 | /金曜映画ショー/ゴースト/ロンドンの幻/ |
| CHARACTER STRING (KEYWORD) RESULTING FROM S6 | /金曜映画ショー/ゴースト/ロンドンの幻■/ |

FIG. 8 (b)

| Label | String |
|---|---|
| CHARACTER STRING CONTAINED EPG DATA | /Hi：Hi！Hi/ |
| CHARACTER STRING RESULTING FROM S1 | /Hi：Hi！Hi/ |
| CHARACTER STRING RESULTING FROM S2 | /Hi■Hi■Hi■/ |
| CHARACTER STRING RESULTING FROM S3 | /Hi/Hi/Hi/ |
| CHARACTER STRING RESULTING FROM S4 | /Hi/Hi/Hi/ |
| CHARACTER STRING RESULTING FROM S5 | /Hi/Hi/Hi/ |
| CHARACTER STRING (KEYWORD) RESULTING FROM S6 | /Hi/Hi/Hi/ |

FIG. 10 (a)

| Label | Content |
|---|---|
| CHARACTER STRING CONTAINED EPG DATA | これが日本の絶景！！日本の滝布スペシャル |
| CHARACTER STRING RESULTING FROM S1-S6 | これが日本の絶景／日本の滝布／スペシャル／ |
| CHARACTER STRING RESULTING FROM S7 | これが日本の絶景／日本／の／滝布スペシャル／ |
| CHARACTER STRING RESULTING FROM S8 | これが日本の絶景／日本／の／滝布スペシャル／ |
| CHARACTER STRING RESULTING FROM S9 | これが日本の絶景／日本／の／滝布スペシャル／ |
| CHARACTER STRING (KEYWORD) RESULTING FROM S10 | これが日本の絶景／日本／滝布スペシャル／ |

FIG. 10 (b)

| Label | Content |
|---|---|
| CHARACTER STRING CONTAINED EPG DATA | 「バカのための合格テク」 |
| CHARACTER STRING RESULTING FROM S1-S6 | ／バカのための合格／テク／ |
| CHARACTER STRING RESULTING FROM S7 | ／バカ／のための／合格テク／ |
| CHARACTER STRING RESULTING FROM S8 | ／バカ／のための／合格テク／ |
| CHARACTER STRING RESULTING FROM S9 | ／バカ／のための／合格テク／ |
| CHARACTER STRING (KEYWORD) RESULTING FROM S10 | ／バカ／合格テク／ |

FIG. 10 (c)

| Label | Content |
|---|---|
| CHARACTER STRING CONTAINED EPG DATA | 「S」最高峰ヒマラヤの驚異の絶景▽中華夜景の王者！五色にきらめく光の桃源 |
| CHARACTER STRING RESULTING FROM S1-S6 | 最高峰／ヒマラヤ／の／驚異／の／絶景／中華夜景の王者／五色／にきらめく／光の桃源／ |
| CHARACTER STRING RESULTING FROM S7 | 最高峰／ヒマラヤ／の／驚異／の／絶景／中華夜景／の／王者／五色／にきらめく／／光／の／桃源／ |
| CHARACTER STRING RESULTING FROM S8 | 最高峰ヒマラヤ／の／驚異／の／絶景／中華夜景の王者／五色／にきらめく／光の桃源／ |
| CHARACTER STRING RESULTING FROM S9 | 最高峰ヒマラヤ／の驚異／の絶景／中華夜景の王者／五色／にきらめく／光の桃源／ |
| CHARACTER STRING (KEYWORD) RESULTING FROM S10 | 最高峰ヒマラヤ／驚異／絶景／中華夜景の王者／五色／桃源／ |

FIG. 12 (a)

CHARACTER STRING CONTAINED EPG DATA
／「S」大ヒットカツテンサンバに続く真山茂男新キャラ誕生▽小塚愛にフラれた男スタジオ乱入…彼氏はあの芸人？／
CHARACTER STRING RESULTING FROM S1-S5
／大ヒットカツテンサンバに続く真山茂男新キャラ誕生／小塚愛にフラれた男スタジオ乱入／彼氏はあの芸人／
CHARACTER STRING RESULTING FROM S10
／大ヒットカツテンサンバに続く／真山茂男新キャラ誕生／小塚愛にフラれた男スタジオ乱入／彼氏はあの芸人／
CHARACTER STRING RESULTING FROM S11
／大ヒットカツテンサンバに続く／真山茂男新キャラ誕生／小塚愛にフラれた男スタジオ乱入／彼氏はあの芸人／

FIG. 12 (b)

CHARACTER STRING CONTAINED EPG DATA
／「大空港警察署長朝日真一郎走る!!羽田空港に持ち込まれた偽ブランド商品が事件の核心へ!!／
CHARACTER STRING RESULTING FROM S1-S5
／大空港警察署長朝日真一郎走る／羽田空港に持ち込まれた偽ブランド商品が事件の核心へ／
CHARACTER STRING RESULTING FROM S10
／大空港警察署長朝日真一郎走名／羽田空港に持ち込まれた偽ブランド商品が事件の核心へ／
CHARACTER STRING RESULTING FROM S11
／大空港警察署長朝日真一郎走名／羽田空港に持ち込まれた偽ブランド商品が事件の核心へ／

| No | NAME | MEMBER |
|----|------|--------|
| | CHAT ROOM | |
| 1 | うたばんぐみ | 5 |
| 2 | カツケンサンバ | 1 |
| 3 | 梅平健 | 0 |
| 4 | オー娘 | 0 |
| 5 | ばら組 | 2 |
| 6 | 中山裕子 | 4 |
| NEXT▼ | | SELECT OTHER ROOM |

FIG. 15

| No | BLOG NAME | COMMENT |
|----|-----------|---------|
| 1 | うたばんぐみ | 12 |
| 2 | カツケンサンバ | 0 |
| 3 | 梅平健 | 3 |
| 4 | オー娘 | 25 |
| 5 | ばら組 | 8 |
| 6 | 中山裕子 | 7 |

NEXT▼   SELECT OTHER TITLE

FIG. 16

BLOG

CATEGORY

TITLE ▼   PLEASE SELECT  ---72

MAKE THE USER SELECT THE TITLES FROM THE MENU

うたばんぐみ
カツケンサンバ
小塚愛
オー娘

CHARACTER INPUT

71

NETWORK CONNECTING DEVICE, SERVER DEVICE, TERMINAL DEVICE, SYSTEM, RECEIVING METHOD, CHARACTER INPUT METHOD, TRANSMISSION METHOD, PROGRAM, AND COMPUTER-READABLE STORAGE MEDIUM

This nonprovisional application claims the benefit of U.S. Provisional Application, 60/715,568 filed on Sep. 12, 2005, the entire contents of all of which are hereby incorporated by reference.

FIELD OF THE INVENTION

The present invention relates to a network connecting device, a server device, a terminal device, and a system, which constitute a network for enabling delivery and reproduction of programs and for transmitting/receiving various information items regarding the program currently reproduced. The present invention also relates to a method for transmitting/receiving information regarding the program reproduced by the user.

BACKGROUND OF THE INVENTION

Mobile phone terminals have become wide-spread recently, and its multi-functionality is also developing, allowing the users to access various services, such as an on-line chat, a blog, or e-mail. In addition to this, some of the recent mobile phone terminals are capable of receiving/displaying TV broadcast. This type of mobile phone terminal is regarded a new device with a function associated with the TV browsing function, rather than a dedicated device for communication. One example of the function may be on-line discussion through a chat/blog/mail system in which different users who have watched the same program at the same time exchange opinions about the TV program.

Meanwhile, in TV broadcast, delivery of EPG (Electronic Program Guide) data is becoming more common with the transition from terrestrial broadcasting to digital. EPG designates information data of the programs to be shown and the program currently running. In digital TV broadcasting, the EPG data is delivered to an installed-type TV or the like capable of receiving digitalized terrestrial broadcast by being interposed into the broadcast wave, to be used for creation/display of a program guide. Further, the EPG data can also be delivered from an EPG data delivery server via a network. Therefore, the foregoing new mobile phone terminal may be given a function of obtaining EPG data delivered from an EPG data server via a network. That is, the foregoing mobile phone terminal can be provided with a function creating a program guide by obtaining EPG data delivered via a network.

Such an EPG data may be used for exchange of opinions regarding TV program between plural mobile phone terminals. For example, Document 1 discloses an electronic device which has a function of transmitting the EPG data regarding the program that the user is currently watching to a specific destination. Further, Document 2 discloses a device for extracting a keyword from character string information in the EPG data.

[Document 1]
Japanese Unexamined Patent Publication Tokukai 2005-184613 (published on Jun. 7, 2005)

[Document 2]
Japanese Unexamined Patent Publication Tokukai 2004-62639 (published on Feb. 26, 2004)

However, when the user desires to exchange opinions with other terminals regarding the TV program that the user is currently watching by using a message exchange system, a conventional mobile phone terminal requires the user to go through so many processes before the user is actually allowed to transmit the message regarding the program. In addition to such a difficulty in accessing the message exchange service, the operation for transmitting the message regarding the program sometimes often interferes the view/sound of the TV program.

The following more specifically explains this problem.

For example, to exchange opinions regarding a TV programs by using a message exchange system, such as a chat or a blog, the user first needs to carry out search for a message exchange service related to the TV program the user has been watching, among the various message exchange services on the network. The user generally carries out this search using the data bases on the network. However, to carry out the search for the desired message exchange system in a conventional mobile phone, the user is required to input queries.

Further, even if the user succeeded to enter the message exchange system related to the program, the user is then required to input texts as the messages by using input means such as keyboard. As described in Document 1, the direct insertion of the EPG data into an e-mail is convenient enough for the purpose of transmitting program information to the other user without hitting key repeatedly; however, it does not help to increase efficiency in input of message by the user, such as opinion regarding the program.

The present invention is made in view of the foregoing problems, and the object is to provide a network connecting device capable of receiving TV broadcast and allowing the user to easily exchange messages regarding the program that the user has been watching.

SUMMARY OF THE INVENTION

The present invention is made in view of the foregoing problems, and the object is to provide a network connecting device capable of receiving TV broadcast and allowing the user to easily exchange messages regarding the program that the user has been watching.

In order to achieve the foregoing object, a network connection device according to the present invention is connected to a network and capable of reproducing a program delivered to a plurality of users, and the network connecting device includes: program information acquiring means for acquiring program information regarding a program reproduced in the network connecting device; keyword extracting means for extracting one or more keywords from the program information; searching means for searching/acquiring one or more of titles and addresses related to at least one of said one or more keywords from a database on the network, which database previously stores titles and corresponding addresses, each title and a corresponding address are related to one or more keywords and given to a certain message exchange system, the address indicating location of data for causing the network connecting device to function as a terminal device for the message exchange system; and displaying means for displaying a list of said one or more titles acquired from the database in a display which is capable of receiving a display signal from the network connecting device, the searching means receiving data indicated by an address of a title selected by the user among the list of said one or more titles.

In the above arrangement, the message exchange system is a system constructed so that the user of the network connecting device exchanges messages with other user via the network. For example, a system concerning a chat system, a blog system, and the like is used as the message exchange system. Further, a title is given to the message exchange system so that the user finds a theme on which the message exchange is carried out. Thus, the user searches a message exchange system which allows desired message exchange, and when the user finds out the desired message exchange system, the user accesses the message exchange system.

According to the above arrangement, on the basis of the keyword(s) extracted by the extracting means from the program information regarding the reproduced program, the searching means searches title(s) and address(es) related to the keyword(s), and when the searching means finds the title(s) and the address(es), the searching means acquires them. The displaying means displays a list of the acquired title(s). On this account, the user can select the desired message exchange system on the basis of the displayed list of the title(s). Further, data for causing the network connecting device to function as a terminal device of the selected message exchange system is received by the searching means, so that the user can promptly begin using the message exchange system. That is, the above arrangement gives an effect in which the user can easily use, by a smaller number of steps, a message exchange system related to a program being reproduced.

Note that, a condition under which the program is distributed is not particularly limited as long as the program is distributed to a plurality of users: e.g., distribution of a TV program or a radio program on a broadcasting wave and distribution of program contents via a network.

In order to achieve the foregoing object, a network connecting device according to the present invention is connected to a network and capable of reproducing a program delivered to a plurality of users, and the network connecting device includes: program information acquiring means for acquiring program information regarding a program reproduced in the network connecting device; keyword extracting means for extracting one or more keywords from the program information; displaying means for displaying a list of said one or more keywords in a display which is capable of receiving a display signal from the network connecting device; and character inputting means for receiving a keyword selected by the user among the list of keywords displayed in the display section as an input character string given by the user.

According to the above arrangement, the displaying means displays in a display a list of the keywords extracted by the keyword extracting means from the program information regarding the program and acquired by the program information acquiring means. Further, when the user selects a single keyword from the list of the keywords, the character inputting means receives the selected keyword as an input character string given by the user. This arrangement results in an effect in which the user can easily input, by a smaller number of steps, a keyword regarding the program, being reproduced, with respect to the network connecting device.

In order to achieve the foregoing object, a network connecting device according to the present invention is connected to a network and capable of reproducing a program delivered to a plurality of users, and the network connecting device includes: program information acquiring means for acquiring program information regarding a program reproduced in the network connecting device; keyword extracting means for extracting one or more keywords from the program information; a dictionary database for storing a plurality of terms respectively associated with different character strings; displaying means for displaying, when the user inputs a character string including at least one character, all terms associated with the character string in the dictionary database, in a display capable of receiving a display signal from the network connecting device; and input character converting means for receiving a term selected by the user among the terms displayed in the display section as an input character string given by the user, wherein: the input character converting means stores said one or more keywords in the dictionary database, the keywords being respectively associated with the different character strings in the dictionary database.

According to the above arrangement, when the user inputs a character string including at least one character, terms which have been associated with the character string in advance are read out by the displaying means from the dictionary database, and a list of the terms is displayed in the display as a selection option. As the dictionary database, it is possible to use an existing predictive text entry dictionary, Hiragana/Katakana to Kanji conversion dictionary or the like. On this account, the user can select a desired term from the displayed list of the terms so as to input the selected term. Here, the dictionary database stores the keyword(s) extracted from the program information regarding the reproduced program so that the keyword(s) are associated with a specific character string by the input character converting means. Thus, when the user inputs a certain character string, also keyword(s) regarding a program being reproduced is displayed as a conversion option. Thus, when the user selects as a conversion option a keyword from the displayed list of the terms, the keyword is received as a character string inputted by the user through the input character converting means. In this manner, the arrangement gives an effect in which the user can easily input, by a smaller number of steps, keyword(s) regarding a program being reproduced.

In order to achieve the foregoing object, a server device according to the present invention is connected via a network to a terminal device reproducing a program delivered to a plurality of users, and the server device includes: ID receiving means for receiving from the terminal device a program ID for specifying a program reproduced in the terminal device; program information acquiring means for acquiring program information regarding the program specified by the program ID; keyword extracting means for extracting one or more keywords from the program information; searching means for searching/acquiring one or more of titles and addresses related to at least one of said one or more keywords from a database on the network, which database previously stores titles and corresponding addresses, each title and a corresponding address are related to one or more keywords and given to a certain message exchange system, the address indicating location of data for causing the network connecting device to function as a terminal device for the message exchange system; and data transmitting means for transmitting said one or more titles and addresses acquired from the database to the terminal device.

The above arrangement gives an effect in which: it is possible to send, to the terminal device reproducing a program, title(s) and address(es) given to message exchange service that has been associated with keyword(s) regarding the program reproduced in the terminal device.

In order to achieve the foregoing object, a server device according to the present invention is connected via a network to a terminal device reproducing a program delivered to a plurality of users, and the server device includes: ID receiving means for receiving from the terminal device a program ID for specifying a program reproduced in the terminal device; program information acquiring means for acquiring program information regarding the program specified by the program ID; keyword extracting means for extracting one or more keywords from the program information; and data transmitting means for transmitting said one or more keywords to the terminal device.

The foregoing arrangement gives an effect in which it is possible to send keyword(s) regarding a program reproduced in the terminal device.

In order to achieve the foregoing object, a reception method according to the present invention is a method for receiving data for causing a network connecting device to function as a terminal device of a message exchange system related to a program reproduced in the network connecting device, the network connecting device being connected to a network and capable of reproducing a program delivered to a plurality of users, and the reception method includes the steps of: (i) acquiring program information regarding the program reproduced in the network connecting device; (ii) extracting one or more keywords from the program information; (iii) searching/acquiring one or more of titles and addresses related to at least one of said one or more keywords from a database on the network, which database previously stores titles and corresponding addresses, each title and a corresponding address are related to one or more keywords and given to a certain message exchange system, the address indicating location of data for causing the network connecting device to function as a terminal device for the message exchange system; (iv) displaying a list of said one or more titles acquired from the database in a display which is capable of receiving a display signal from the network connecting device; and (v) receiving data indicated by an address of a title selected by the user among the list of said one or more titles.

According to the above arrangement, it is possible to provide a reception method by which: as with the effect obtained by the arrangement of the above-explained network connecting device of the present invention, the user can easily use, by a smaller number of steps, a message exchange system regarding a program being reproduced.

In order to achieve the foregoing object, a character input method according to the present invention is a method for inputting characters by a user to a network connecting device, which is connected to a network and capable of reproducing a program delivered to a plurality of users, and the character input method includes the steps of (i) acquiring program information regarding the program reproduced in the network connecting device; (ii) extracting one or more keywords from the program information; (iii) displaying a list of said one or more keywords in a display capable of receiving a display signal from the network connecting device; and (iv) receiving a keyword selected by the user among the list of said one or more keywords displayed in the display section as an input character string given by the user.

According to the above arrangement, it is possible to provide a character input method by which: as with the effect obtained by the arrangement of the above-explained network connecting device of the present invention, the user can easily input, by a smaller number of steps, to the network connecting device keyword(s) regarding a program being reproduced.

In order to achieve the foregoing object, a character input method according to the present invention is a method for inputting characters by a user to a network connecting device, which is connected to a network and capable of reproducing a program delivered to a plurality of users, and the character input method includes the steps of: (i) acquiring program information regarding the program reproduced in the network connecting device; (ii) extracting one or more keywords from the program information; (iii) storing said one or more keywords into a database which stores a plurality of terms respectively associated with different character strings, by respectively relating the keywords to different one of the plurality of terms; (iv) displaying means for displaying, when the user inputs a character string including at least one character, all terms associated with the character string in the dictionary database, in a display capable of receiving a display signal from the network connecting device; and (v) receiving a term selected by the user among the terms displayed in the display section as an input character string given by the user.

According to the above arrangement, it is possible to provide a character input method by which: as with the effect obtained by the arrangement of the above-explained network connecting device of the present invention, the user can easily input, by a smaller number of steps, keyword(s) regarding a program being reproduced.

In order to achieve the foregoing object, a transmission method according to the present invention is a method for a server device connected via a network to a terminal device reproducing a program delivered to a plurality of users, the transmission method being used for transmitting to the terminal device one or more titles and corresponding addresses of message exchange system related to a program reproduced in the terminal device, and the transmission method includes the steps of: (i) receiving from the terminal device a program ID for specifying a program reproduced in the terminal device; (ii) acquiring program information regarding the program specified by the program ID; (iii) extracting one or more keywords from the program information; (iv) searching/acquiring one or more of titles and addresses related to at least one of said one or more keywords from a database on the network, which database previously stores titles and corresponding addresses, each title and a corresponding address are related to one or more keywords and given to a certain message exchange system, the address indicating location of data for causing the network connecting device to function as a terminal device for the message exchange system; and (v) transmitting said one or more titles and addresses acquired from the database to the terminal device.

According to the above arrangement, it is possible to provide a transmission method by which it is possible to transmit to the terminal device title(s) and address(es) given to message exchange service that has been associated with keyword(s) regarding a program reproduced in the terminal device.

In order to achieve the foregoing object, a transmission method according to the present invention is a method for a server device connected via a network to a terminal device reproducing a program delivered to a plurality of users, the transmission method being used for transmitting to the terminal device one or more keywords related to a program reproduced in the terminal device, and the transmission method includes the steps of: (i) receiving from the terminal device a program ID for specifying a program reproduced in the terminal device; (ii) acquiring program information regarding the program specified by the program ID; (iii) extracting one or more keywords from the program information; and (iv) transmitting said one or more keywords to the terminal device.

According to the above arrangement, it is possible to provide a transmission method by which it is possible to transmit to the terminal device keyword(s) regarding a program reproduced in the terminal device.

As described above, the network connecting device, the terminal device, or the server device according to the present invention includes at least: program information acquiring means for acquiring program information regarding a program reproduced in the network connecting device or the terminal device; keyword extracting means for extracting one or more keywords from the program information; and searching means for searching/acquiring one or more of titles and addresses related to at least one of said one or more keywords from a database on the network, which database previously stores titles and corresponding addresses, each title and a corresponding address are related to one or more keywords and given to a certain message exchange system, the address indicating location of data for causing the network connecting device to function as a terminal device for the message exchange system.

Therefore, the arrangement gives an effect in which: on the basis of the keyword(s) extracted from the program information regarding the program reproduced in the network connecting device or the terminal device, it is possible to acquire title(s) and address(es) indicative of message exchange system(s) related to the program being reproduced.

Further, the network connecting device or the terminal device is arranged so as to include displaying means for displaying a list of the acquired title(s) of the message exchange system(s) in a display which is capable of transmitting a display signal from the network connecting device, wherein the searching means receives data indicated by an address of a title selected by the user among the list of said one or more titles. In the network connecting device or the terminal device, when the user selects a desired title, data for causing the network connecting device to function as a terminal device of the message exchange system having the title is received, so that the user can promptly begin using the message exchange system. Thus, the arrangement gives an effect in which the user can easily use, by a smaller number of steps, a message exchange system regarding a program being reproduced.

Further, the network connecting device, the terminal device, or the server device according to the present invention includes at least: program information acquiring means for acquiring program information regarding a program reproduced in the network connecting device or the terminal device; and keyword extracting means for extracting one or more keywords from the program information.

Therefore, the server device including data transmitting means for transmitting the extracted keyword(s) to the terminal device gives an effect in which it is possible to transmit keyword(s) regarding a program reproduced in the terminal device to the terminal device which receives TV broadcast.

Further, the network connecting device or the terminal device is arranged so as to include: displaying means for displaying a list of the keyword(s) in a display capable of transmitting a display signal from the network connecting device; and character inputting means for receiving a keyword selected by the user from the displayed list of the keyword as a character string inputted by the user. In the network connecting device or the terminal device, when the user selects a keyword from the displayed list of the keywords regarding a program being reproduced, the character inputting means receives the keyword as a character string inputted by the user. This results in an effect in which the user can easily input, by a smaller number of steps, keyword(s) regarding a reproduced program to the network connecting device.

Further, the network connecting device or the terminal device is arranged so as to include: a dictionary database for storing a plurality of terms respectively associated with different character strings; displaying means for displaying, when the user inputs a character string including at least one character, all terms associated with the character string in the dictionary database, in a display capable of transmitting a display signal from the network connecting device; and input character converting means for receiving a term selected by the user among the terms displayed in the display section as an input character string inputted by the user, wherein: the input character converting means stores said one or more keywords in the dictionary database, the keywords being respectively associated with the different character strings in the dictionary database. In the network connecting device or the terminal device, when the user inputs a certain character string, also keyword(s) regarding a program being reproduced is displayed as a conversion option. Thus, when the user selects as a conversion option a keyword from the displayed list of the terms, the keyword is received as a character string inputted by the user through the input character converting means. In this manner, the arrangement gives an effect in which the user can easily input, by a smaller number of steps, keyword(s) regarding a program being reproduced.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 5 is an explanatory diagram showing a specific example of EPG data.

FIGS. 7(a) to 7(d) are explanatory diagrams showing examples of characters and symbols to be deleted from each character string included in the EPG data.

FIGS. 8(a) and 8(b) are explanatory diagrams showing an application example of a keyword extracting process performed by the keyword extracting means.

FIGS. 10(a) to 10(c) are explanatory diagrams showing application examples of the character-type splitting step.

FIGS. 12(a) and 12(b) are explanatory diagrams showing application examples of the character-type splitting step.

FIG. 15 is an explanatory diagram showing a screen which displays a list of the titles of acquired blogs.

FIG. 16 is an explanatory diagram showing an example of a screen which is displayed in a step of accepting a user's input(s) of the title of an article.

DESCRIPTION OF THE EMBODIMENTS

First Embodiment

One embodiment of the present invention will be described below with reference to FIGS. 1 through 27.

Figure 2:
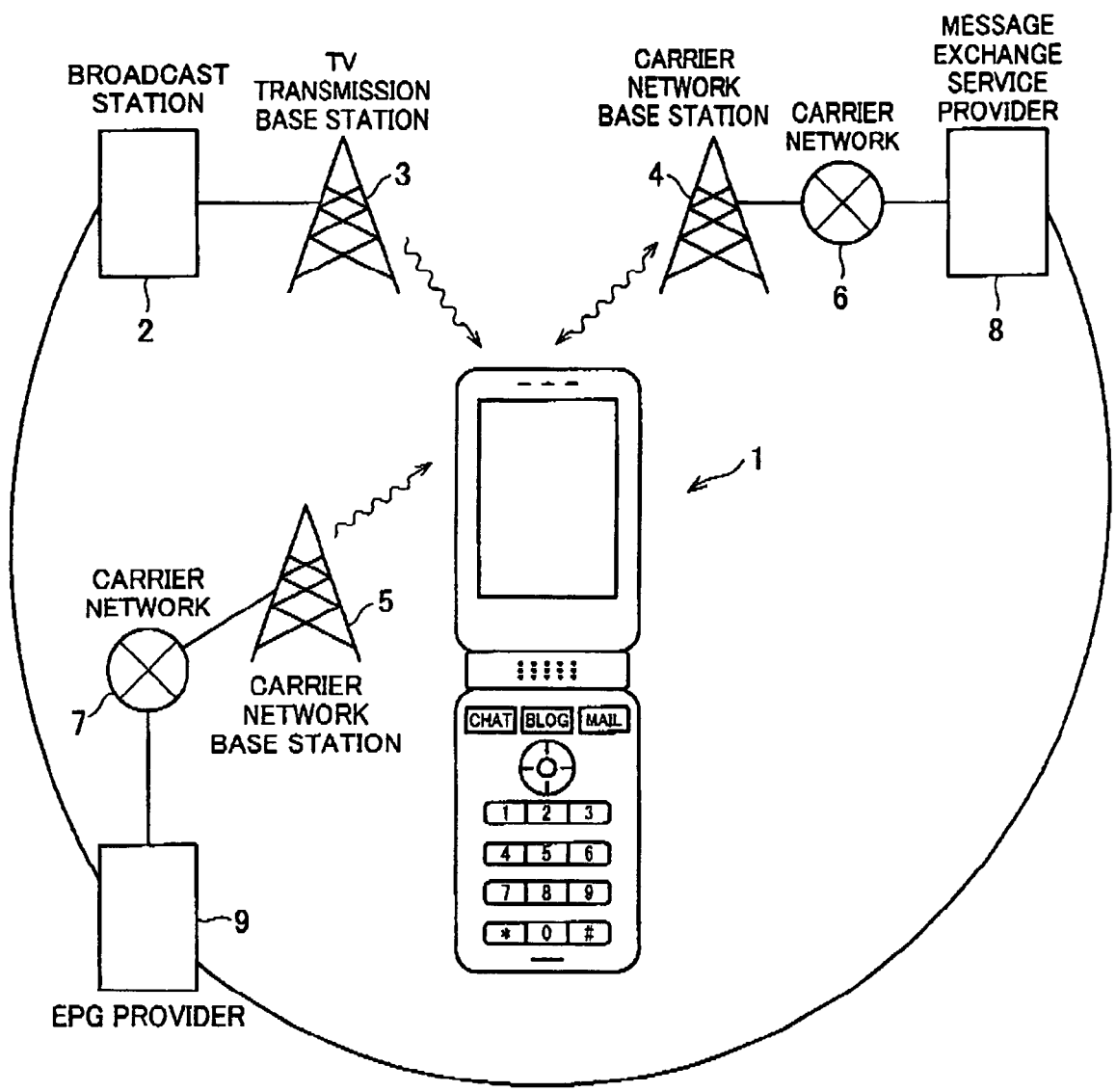
FIG. 2 is an explanatory diagram schematically illustrating a system structure of the present invention.

A mobile phone (network connecting device) 1 according to the present invention can be used for receiving/displaying TV program and for data communication with the other network devices, in addition to the conventional communication function. More specifically, as shown in FIG. 2, the mobile phone 1 receives TV broadcast wave from a broadcast station 2 via a TV transmission base station 3, and displays the images contained in the TV broadcast wave. Further, as shown in FIG. 2, the mobile phone 1 carries out wireless communication between the carrier network base stations 4 and 5, and carries out data communication among other network connecting devices connected to the carrier networks 6 and 7. For example, as shown in FIG. 2, the mobile phone 1 is capable of carrying out data communication with a server device (not shown) which is provided in a message exchange service provider 8 and is connected to the carrier network 6. Similarly, as shown in FIG. 2, the mobile phone 1 is also capable of carrying out data communication with an EPG data server device (not shown) which is provided in a EPG provider 9 and is connected to the carrier network 7. In this way, the mobile phone 1 obtains EPG data delivered from the EPG provider 9 via the carrier network 7. Further, the EPG data can be delivered from the EPG provider 9 to the broadcast station 2, thereby superposing it on the broadcast wave. The EPG data may otherwise be delivered from the EPG provider 9 to an EPG analyzing server, which is provided, for example, in the message exchange service provider 8.

Accordingly, the user of the mobile phone 1 is allowed to access a message exchange service provided by the message exchange service provider 8. The mobile phone 1 serves as one of the terminal devices of a message exchange system for performing a chat, a blog etc., provided by the message exchange service provider 8. Here, the message exchange system designates a system constituted of a server device and a plurality of terminal devices connected to the server device via a network, allowing message exchange between the users of the respective terminal devices.

Chat and blog are well-known examples performed through the message exchange system. The chat as one of the message exchange systems allows real-time message exchange between users of the respective terminal devices. The blog on the other hand allows all users in the system to browse a virtual diary or an article given by a user of one of the terminal devices so that they can write comments on it. The following describes the mobile phone 1 for use in a chat and a blog. However, it should be noted that the mobile phone 1 is also suitable for other message exchange systems, such as a bulletin board system, an instant message system, a short message system etc.

The mobile phone 1 obtains data from the server device of the message exchange service provider 8 via the wireless data communication, so as to access the message exchange system provided by the message exchange service provider 8. Here, the data received by the mobile phone 1 is not particularly limited as long as it causes the mobile phone 1 to function as a terminal device of the message exchange system. For example, the data may be a program code executable in the mobile phone 1, or may be a HTML document. Note that, since a method of causing the mobile phone 1 to function as a terminal device of the message exchange system is conventionally well-known, the explanation is omitted here.

Further, the mobile phone 1 is capable of writing, transmitting and receiving e-mail. More specifically, the user of the mobile phone 1 can exchange messages with the users of other network connecting devices connected to the carrier networks 6 and 7. Note that, since a method of causing the mobile phone 1 to function as a terminal device of the message exchange system is conventionally well-known, the explanation is omitted here.

Figure 3:
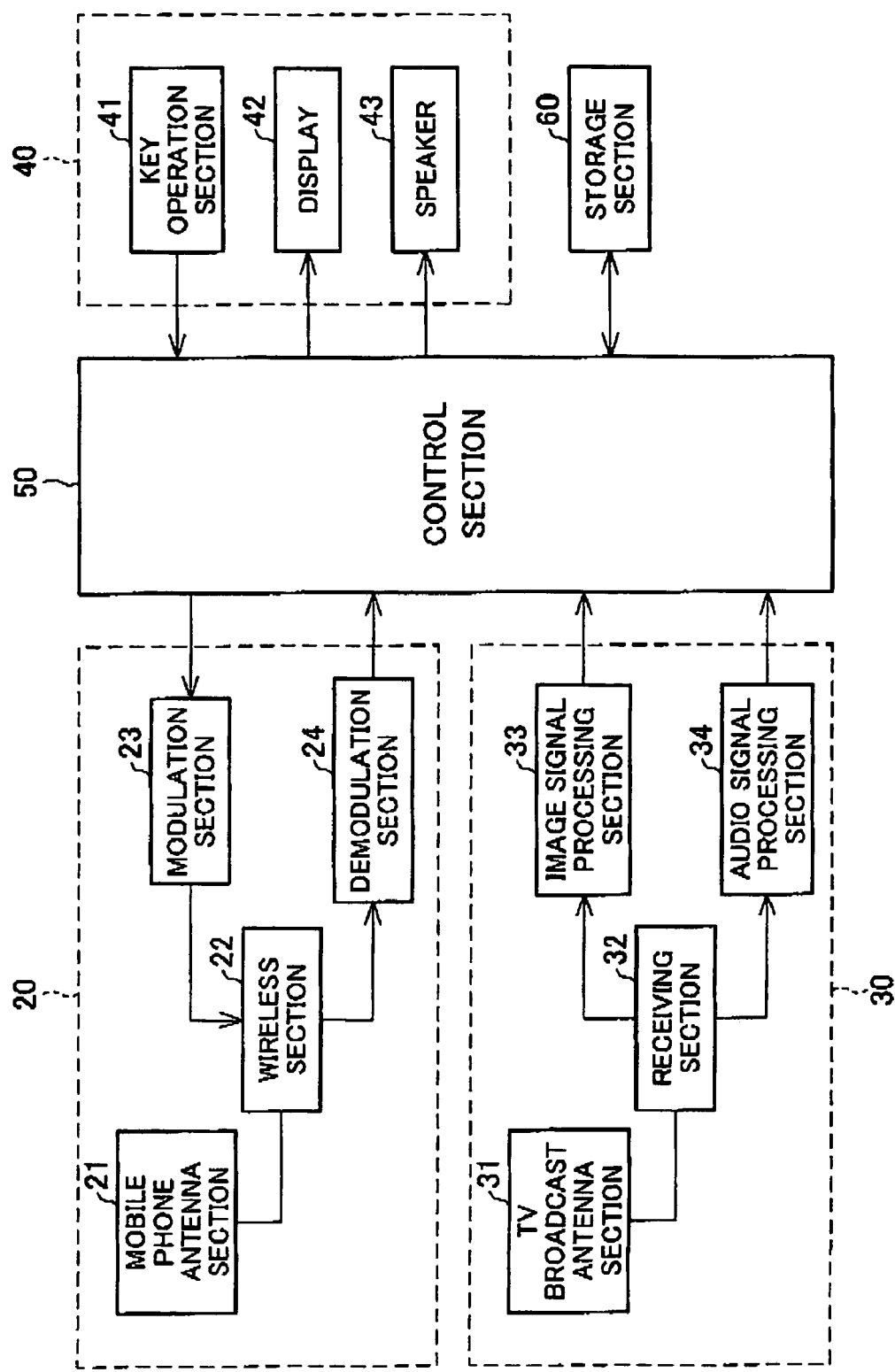
FIG. 3 is a block diagram illustrating a structure of the mobile phone as a network connecting device of the present invention.
Figure 4:
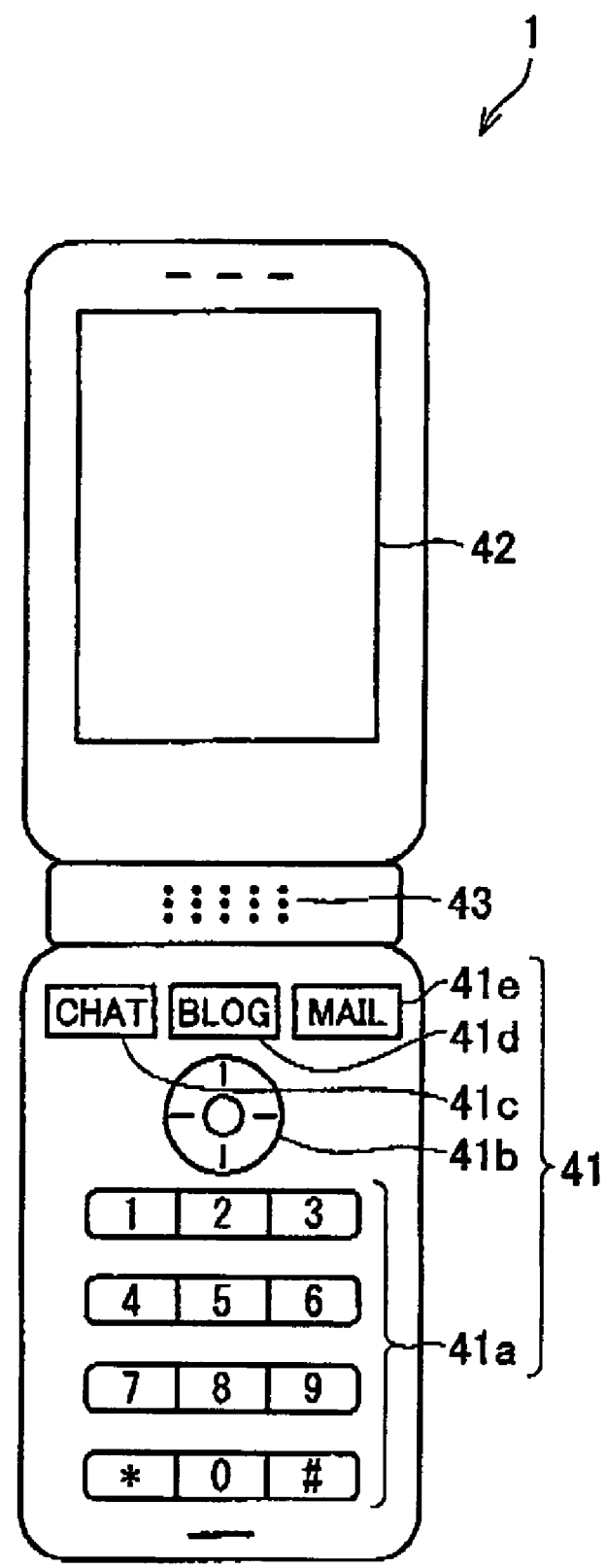
FIG. 4 is a front view illustrating an external appearance of the mobile phone.

The following explains a structure of the mobile phone 1 with reference to FIGS. 3 and 4.

FIG. 3 is a block diagram illustrating a structure of mobile phone 1. As shown in FIG. 3, the mobile phone 1 includes a wireless communication section 20, a TV broadcast receiving section 30, an interface section 40, a control section 50 and a storage section.

The wireless communication section 20 serves to carry out data communication with respect to the carrier network. As shown in FIG. 3, the wireless communication section 20 includes a mobile phone antenna section 21, a wireless section 22, a modulation section 23, and a demodulation section 24. The mobile phone antenna section 21 receives electromagnetic waves transmitted from the carrier network base stations 5 and 6, and also transmits electromagnetic waves to the carrier network base stations 5 and 6. Before transmitted from the mobile phone antenna section 21, the signal is modulated by the modulation section 23. Further, the demodulation section 24 demodulates electromagnetic waves received by the mobile phone antenna section 21, and transmits the demodulated signals to the control section 50. Note that, the wireless communication section 20 serves to carry out wireless data communication between the mobile phone 1 and the carrier network, but the present invention is not limited to the structure including the wireless communication section. That is, the network connecting device of the present invention may omit the wireless communication section in some cases, for example, when the device is connected to a network via a LAN cable.

The TV broadcast receiving section 30 serves to receive TV broadcast wave. As shown in FIG. 3, the TV broadcast section 30 includes a TV broadcast antenna section 31, a receiving section 32, an image signal processing section 33 and an audio signal processing section 34. The TV broadcast antenna section 31 receives TV broadcast wave transmitted from the TV transmission base station 3. The receiving section 32 examines a broadcast wave corresponding to the channel selected among the TV broadcast waves by the user through a predetermined method, and then splits the wave into an image signal and an audio signal. The image signal processing section 33 and the audio signal processing section 34 processes the image signal and the audio signal resulting from division of the broadcast wave, and sends the signals to the control section 50.

The interface section 40 serves to receive an input command from the user, and outputs image and audio to the user. As shown in FIG. 3, the interface section 40 includes a key operation section 41, a display 42, and a speaker 43.

The following explains the functions of the respective components of the interface section 40 also with reference to FIG. 4. FIG. 4 is an outline view of the mobile phone 1, illustrating a structure example of the interface section 40.

As shown in FIG. 4, the key operation section 41 is made of a plurality of keys. In response to user's operation of pressing the keys, the key operation section 41 transmits a predetermined signal to the control section 50. This allows the user to carry out various operations of the mobile phone 1. In the structure example of FIG. 4, the key operation section 41 includes a character-inputting key group 41a, a multi selector 41b, a chat start-up button 41c, a blog start-up button 41d, and a mail start-up button 41e.

The character-inputting key group 41a is constituted of a plurality of keys, each of which corresponds to a predetermined number, a Hiragana, an alphabet, or a symbol. By pressing these keys of the character-inputting key group 41a, the user can input numbers, Hiraganas, alphabets, or symbols to the mobile phone 1.

The multi selector 41b forms a cross. By pressing the upper end of the cross, the user can input "up"; in a similar way, "down", "left" and "right" can be inputted. By pressing the center of the multi selector, the user can input "enter". Note that, here, the respective inputs of "up", "down", "left", "right" and "enter" do not mean input of characters of "up", "down", "left", "right" and "enter", but mean input of respective commands corresponding to "up", "down", "left", "right" and "enter". The processings corresponding to these commands may be vertical/horizontal moves of a cursor in a screen displayed in a display 42.

Note that, in the following explanation, user's input operation is simplified within a range in which the reader does not misunderstand the details. For example, a user's operation of repeatedly pressing the keys of the character-inputting key group 41a so as to continuously input characters corresponding to the respective keys is called "input of character string". Further, "selection of character string" from a plurality of character strings displayed in the display 42 means user's operation of the multi selector 41c, followed by pressing of the center of the multi selector 41b with the cursor pointing a desired character string.

The mobile phone 1 is suitable for a terminal of a message exchange system requiring text input, such as a chat or a blog. Further, the mobile phone 1 is also suitable for message exchange using e-mail. For this function, the mobile phone 1 includes the chat start-up button 41c, the blog start-up button 41d, and the mail start-up button 41e. By pressing these buttons, the user is allowed to immediately access a corresponding service.

Note that, the structure of a key operation section 41 shown in FIG. 4 is only an example, and the present invention is not limited to this For example, the respective start-up buttons 41c, 41d, and 41e are not indispensable components of the mobile phone 1. More specifically, the user may press a certain combination of keys of the character input key group 41a and/or the multi selector 41b to access those services.

In receiving TV broadcast, the display 42 displays images based on the image signals contained in the broadcast wave. The display 42 also displays an output image of the application when carrying out the service or the application. The speaker 43 outputs sound based on the audio signals contained in the broadcast wave.

As shown in FIG. 3, the mobile phone 1 includes a control section 50 and a storage section 60. These various constituents of the mobile phone 1 are controlled by the control section 50. The details of the control section 50 are described below with reference to a different figure.

The following explains the control section 50 with reference to FIGS. 1 through 21.

Note that, the control section 50 has a function of executing commands of a program code by downloading the program code from another network device via a carrier network. Further, the control section 50 also has a function of reforming and displaying a HTML document by downloading the HTML document from another network device via a carrier network. With these functions, the mobile phone 1 serves as a terminal of a message exchange system, such as a chat or a blog. However, in a network connecting device (e.g., mobile phone), the structure for realizing these function is conventionally well-known, and therefore the explanation is omitted here.

Figure 1:
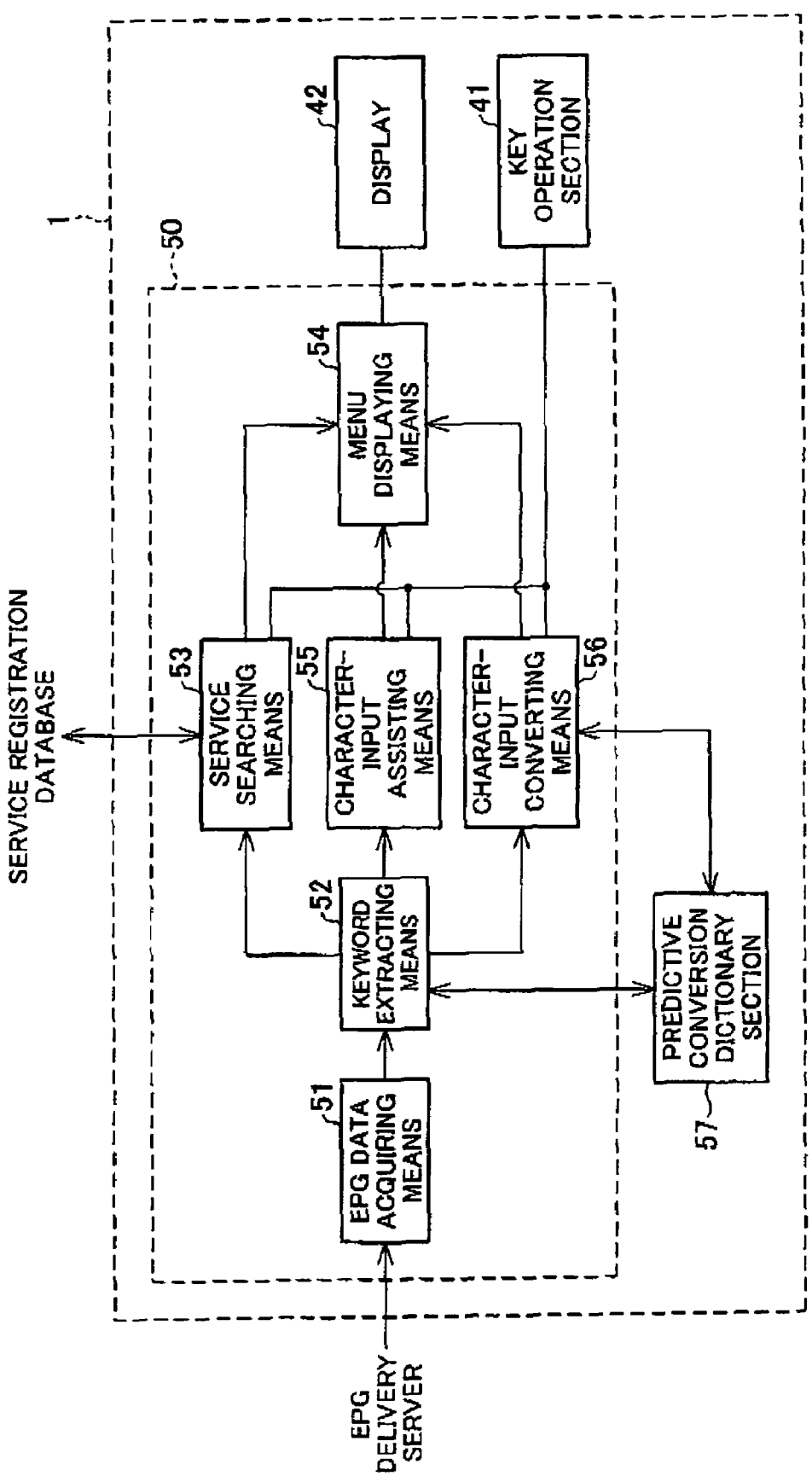
FIG. 1 is a block diagram illustrating a structure of a control section in a mobile phone as a network device of the present invention.

FIG. 1 is a block diagram illustrating a structure of the control section 50. As shown in FIG. 1, the control section 50 includes EPG data acquiring means (program information acquiring means) 51, keyword extracting means 52, service searching means 53 (searching means), menu displaying means (displaying means) 54, character-input assisting means (character inputting means) 55, character-input converting means 56.

First, the EPG data acquiring means 51 is explained. The EPG data acquiring means 51 serves to acquire EPG data regarding a TV program currently running in the mobile phone 1. This acquisition of the EPG data regarding the TV program currently running in the mobile phone 1 is performed as follows.

Note that, the EPG data includes attribution of the program, such as the broadcast station, the date of broadcast, the title of program etc. FIG. 5 shows an example of EPG data First of all, the EPG data acquiring means 51 determines the channel of the program currently received; then, together with the determined channel, the EPG data acquiring means 51 transmits a request for EPG data to an EPG data delivery server provided in the EPG provider 9 (see FIG. 2) via the wireless communication section 20 and the carrier network 7. The EPG data delivery server determines a program currently received in the mobile phone 1 based on the time and the received channel information, and sends back the EPG data containing various information items of the program. Then, the EPG data acquiring means 51 receives EPG data containing various information items of the currently running program via the carrier network 7 and the wireless communication section 20. Note that, the EPG data acquiring means of the present invention is only required to have a function of acquiring EPG data regarding the program currently running, when the mobile phone is receiving TV broadcast. That is, the processing is not limited to the method above Note that, the means for receiving EPG data in the present invention is not limited to the foregoing structure as long as it is capable of receiving EPG data containing various information items of the program currently running. For example, the EPG data acquiring means 51 may extract a program ID, which indicates the program currently running, from the received broadcast wave, and transmit the ID to the EPG data deliver server, so as to acquire EPG data corresponding to the program. Further, if the mobile phone 1 is capable of receiving a broadcast wave on which the EPG data is superimposed, such as a terrestrial digital broadcast wave, the mobile phone 1 may include EPG data acquiring means for extracting the EPG data from the broadcast wave.

Next, the following explains the keyword extracting means 52. The keyword extracting means 52 acquires EPG data from the EPG data acquiring means 51 so as to extract a keyword(s) from the data. Here, the keyword extracted by the keyword extracting means 52 is a character string obtained by dividing a character string contained in the program information. The following explains the division of character string by the keyword extracting means 52, with reference to FIGS. 6 through 12.

Figure 6:
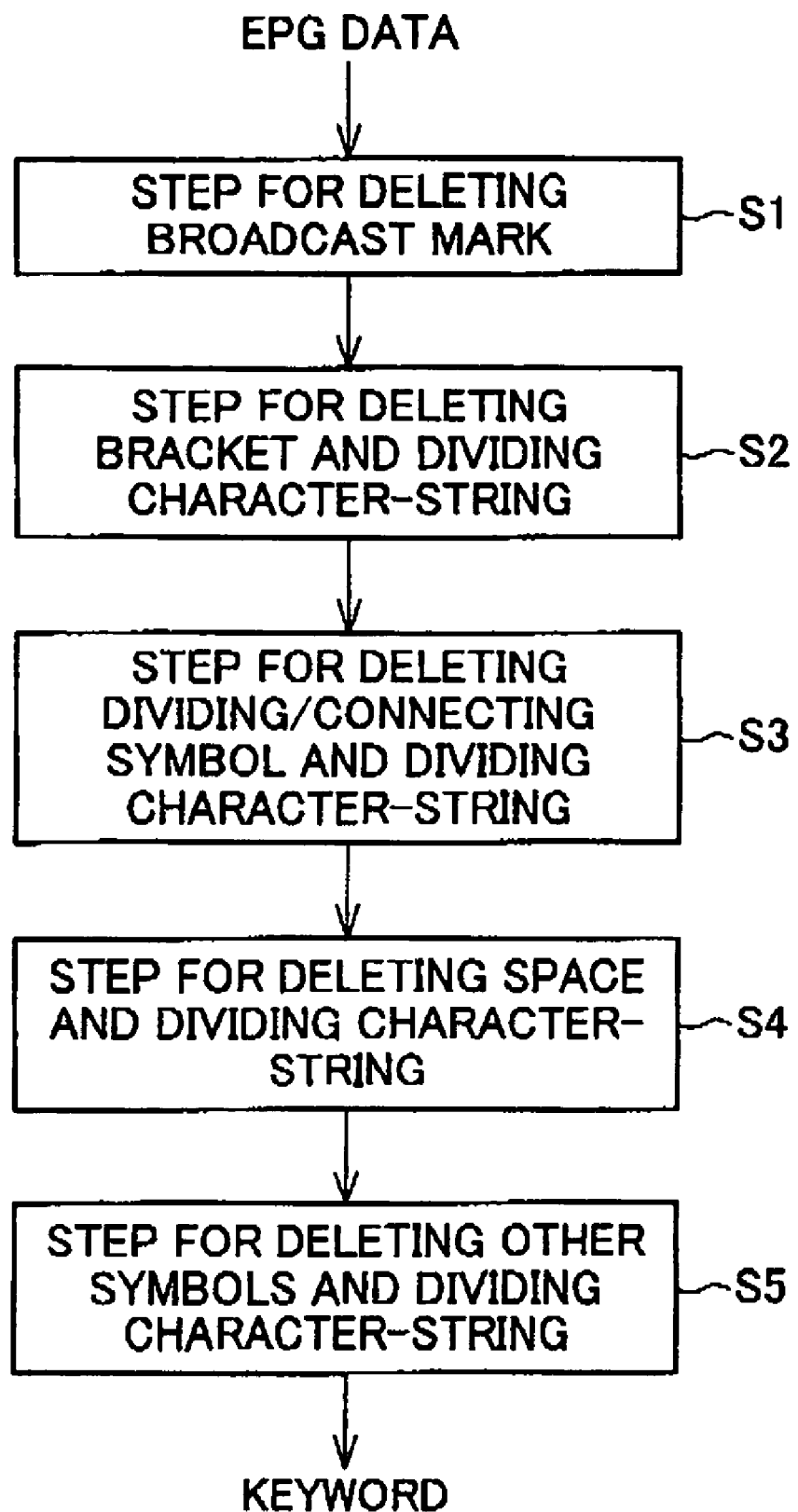
FIG. 6 is a flow chart showing an example of steps of extracting a keyword(s) from the EPG data, performed by a keyword extracting means.

FIG. 6 is a flow chart illustrating an example of the operation for extracting a keyword(s) from the EPG data, performed by the keyword extracting means 52. The following explains the respective steps of the keyword extracting operation shown in the flow chart of FIG. 6.

[Step S1 for Deleting a Broadcast Mark]

In this step, a broadcast mark is deleted from each character string contained in the EPG data. Here, the broadcast mark generally means a diacritic mark regarding the type, attribution etc of the program. The broadcast mark is constituted of a predetermined character placed between two bracket symbols, making the character bracketed off. FIG. 7(*a*) shows an example of the broadcast mark.

(Step S2 for Deleting Bracket and Dividing Character-String)

In this step, the bracket is deleted from the character string generated by deleting the broadcast mark in Step S1. Here, the bracket means one of the predetermined bracket symbols. FIG. 7(*b*) illustrates examples of bracket. Then, the character string is divided at the point where the bracket is deleted into a plurality of character strings.

(Step S3 for Deleting Dividing/Connecting Symbol and Dividing Character-String)

In this step, the symbol for dividing/connecting a sentence or a word is deleted from the character string generated in Step S2. Here, the dividing/connecting symbol means a predetermined symbol for dividing/connecting a sentence or a word. FIG. 7(*c*) illustrates examples of dividing/connecting symbol.

(Step S4 for Deleting Space and Dividing Character-String)

In this step, the space is deleted from the character string generated in Step S3. Then, the character string is further divided at the point where the space is deleted into a plurality of character strings. (Step S5 for deleting other symbols and dividing character-string)

In this step, all remaining symbols are deleted from the character string generated in Step S5. Here, the remaining symbols mean all of the other symbols than the symbol for dividing/connecting a sentence or a word, among the predetermined symbols contained in a set of characters writing the EPG data. FIG. 7(*e*) illustrates examples of the other symbol. Then, the character string is further divided at the point where the symbols are deleted into a plurality of character strings. The resulting character strings are regarded a keyword.

FIGS. 8(*a*) and 8(*b*) show an application example of the keyword extracting process by the keyword extracting means 52. FIGS. 8(*a*) and 8(*b*) respectively show character strings resulting from each of Steps S1 through S5, after a certain character string is extracted from the EPG data. Note that, in FIGS. 8(*a*) and 8(*b*), the symbol "/" separates each character string. Further, as shown herein, when the target character string does not include predetermined symbols used for Steps S1 through S5, the character string is sent for the next step without a change.

Note that, the foregoing key word extraction step is only one of the examples of the keyword extraction operation by the keyword extracting means 52. That is, only the function of extracting keywords from the character string from the EPG data is required for the keyword extracting means 52.

For example, it is also possible that each of the above-mentioned character deleted by the predetermined steps is not deleted but divided before or after a predetermined character. By thus dividing the character string of the EPG data, while leaving the foregoing predetermined characters used for division, the keyword extraction may be performed according to the desired objective using these character strings. For example, in the case of extracting a title of blog or e-mail as a keyword, the above-mentioned broadcast mark is not deleted, and a keyword immediately after the broadcast mark, such as 「出」(broadcast mark indicating the performer), 「ゲ」(broadcast mark indicating the guest), or 「司」(broadcasting mark that shows the host) is extracted in particular. In this way, characters which tend to be used for a title can be selectively extracted.

If a keyword for a search for a message exchange system is wanted, it is preferable that the keyword extracting means 52 carries out character-type splitting step after the processing shown in the flow chart of FIG. 6. This character-type splitting step is performed to divide a keyword with more than a predetermined number of characters, according to the type (Kanji, Hiragana, Katakana, Alphabet, number, etc.) of the character constituting the keyword.

Figure 9:
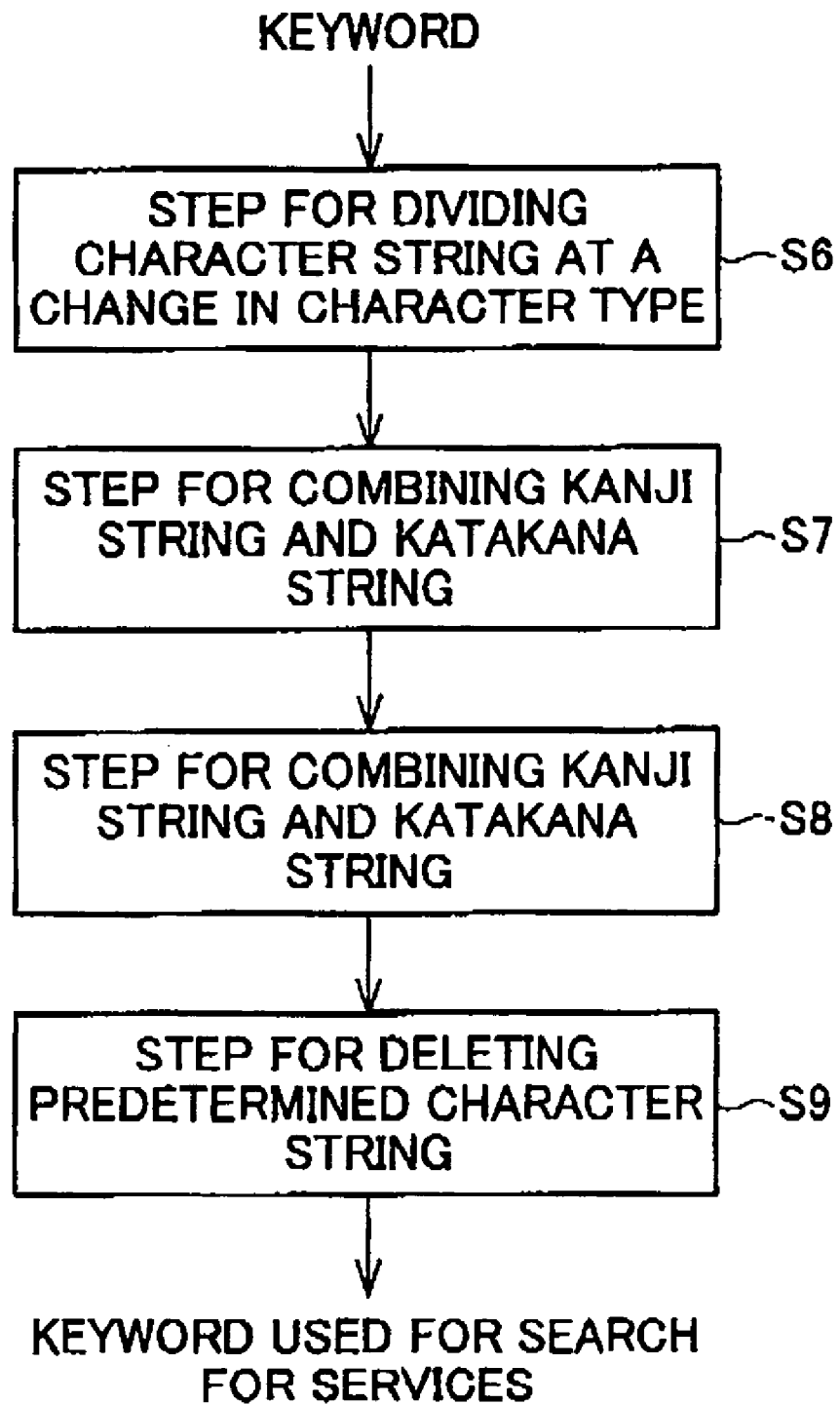
FIG. 9 is a flow chart showing an example of a character-type splitting step which is carried out after a series of steps shown in the flow chart of FIG. 6.

FIG. 9 is a flow chart illustrating a series of character-type splitting steps which is carried out after the process shown in the flow chart of FIG. 6. The following explains these steps shown in the flow chart of FIG. 9.

(Step S6 for Dividing Character String at a Change in Character Type)

In this step, the keyword extracted in the foregoing keyword extraction step is divided at a change in type of character. The change in type of character means a space between different type of characters, e.g., a space between Kanji and Katakana, a space between Kanji and Hiragana, a space between Kanji and Alphabet, etc.

(Step S7 for Combining Kanji String and Katakana String)

In this step, for the character string obtained in Step S6, a Kanji string that consists only of Kanji is combined with a subsequent Katakana character string that consists only of Katakana.

(Step S8 for Combining Katakana String and Kanji String)

In this step, for the character string obtained in Step S7, a Katakana string that consists only of Katakana is combined with a subsequent Kanji character string that consists only of Kanji. (Step S9 for deleting predetermined character string)

In this step, a predetermined character string is deleted from the character string obtained in Step S8. The predetermined character string designates a character string consisting of one Kanji character, a character string consisting of one Katakana character, a character string consisting only of Hiragana characters, or a character string of four characters or less, consisting only of Alphabet.

FIG. 10(a), FIG. 10(b), and FIG. 10(c) show application examples of the character-type splitting step. FIGS. 10(a), 10(b) and 10(c) respectively show character strings resulting from each of Steps S6 through S9, after a certain keyword is extracted through the keyword extraction step shown in FIG. 6. Note that, the character-type splitting step shown in FIG. 10 is performed to a character string composed of 9 or more characters. This is because such a short sentence with less than a predetermined number of characters is preferably extracted as a keyword without being through S6 through S9. Further, in FIGS. 10(a), 10(b) and 10(c), the symbol "/" separates each character string. Further, when the target character string does not include predetermined symbols used for Steps S6 through S9, the character string is sent for the next step without a change.

If a keyword to be used as an option for character input is wanted, it is preferable that the keyword extracting means 52 carries out a different character-type splitting step after the processing shown in the flow chart of FIG. 6.

Figure 11:
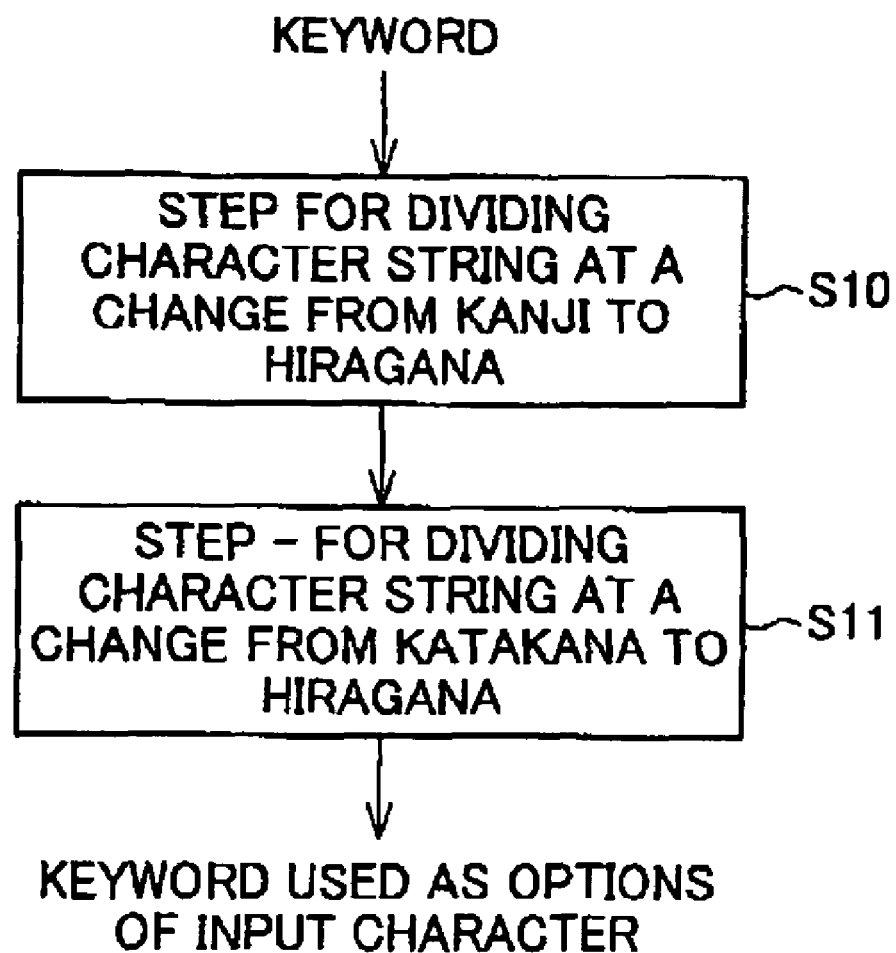
FIG. 11 is a flow chart showing another example of the character-type splitting step which is carried out after a series of steps shown in the flow chart of FIG. 6.

FIG. 11 is a flow chart illustrating another series of character-type splitting steps which is carried out after the process shown in the flow chart of FIG. 6. The following explains these steps shown in the flow chart of FIG. 11. (Step S10 for dividing character string at a change from Kanji to Hiragana)

In this step, the keyword extracted in the foregoing keyword extraction step is helved at a change from a Kanji character to a Hiragana character, when the keyword has more than N (predetermined number) characters. The change from a Kanji character to a Hiragana character means a space between a Kanji character and a subsequent Hiragana character, or a space between a Hiragana character and a subsequent Kanji character. If the keyword has plural changes from Kanji to Hiragana, or Hiragana to kanji, the halving position is determined so that the first character string of the halved sentences has the largest number of characters, however not more than N.

(Step S11 for Dividing Character String at a Change From Katakana to Hiragana)

In this step, the keyword extracted in the foregoing keyword extraction step is halved at a change from a Katakana character to a Hiragana character, when the keyword has more than N (predetermined number) characters. The change from a Katakana character to a Hiragana character means a space between a Katakana character and a subsequent Hiragana character, or a space between a Hiragana character and a subsequent Katakana character. If the keyword has plural changes from Hiragana to Katakana, or Katakana to Hiragana, the halving position is determined so that the first character string of the halved sentences has the largest number of characters, however not more than N.

If the character string still has more character number than the predetermined number even after the steps S10 and S11, the halving process is repeated until the character number becomes less than the predetermined number.

FIG. 12(a) and FIG. 12(b) show application examples of the character-type splitting step. FIGS. 12(a) and 12(b) respectively show character strings resulting from each of Steps S10 and S11, after a certain keyword is extracted through the keyword extraction step shown in FIG. 6. Note that, the character-type splitting step shown in FIG. 12 is performed to a character string composed of 16 or more characters. Further, in FIGS. 12(a) and 12(b), the symbol "/" separates each character string.

Note that, though the process 11 is carried out after the process 10 in the foregoing explanation, it may be arranged so that one of the processes 10 and 11 is selectively carried out.

Further, after the series of operations S1 through S5 shown in FIG. 6, the keyword extracting means 52 may extract a keyword from the character strings generated in step S6, the keyword having the largest number of characters and matching the character string, among the terms stored in the predictive text entry dictionary section 57 (dictionary database).

For example, looking at 「変換」contained in a character string 「黄色に変換しないマジック」, if the predictive text entry dictionary section 57 stores terms like「変換」「変換する」「変換しない」「変換した」「変換機」「変換の」「変換に」「変換し」「変換するはずがない」「変換しなかった」, the term 「変換しない」is extracted because it matches one of the character string among 「黄色に変換しないマジック」and is constituted of the largest number of characters.

Further, among the character strings generated in step S6, the remaining portion from the character dividing (extracting keyword) may be further divided by extracting a different keyword.

By thus extracting a term matching the terms stored in the predictive text entry dictionary section 57 as a keyword among the character strings generated in step S1 through S6, the keyword extraction may be performed with high accuracy, thereby extracting an appropriate keyword which can be used for character input by the user or for search for message exchange service.

Next, the following explains a service searching means 53 shown in FIG. 1. The service searching means 53 serves to search a message exchange service related to the program that the user has been watching. The service searching means 53 obtains a keyword extracted from the EPG data through the foregoing series of the operations performed by the keyword extracting means 52. Then, the service searching means 53 transmits the keyword to a predetermined message exchange service registration database connected to a carrier network 6, so as to obtain an address and a title associated with the keyword. More specifically, using the keyword extracted by the keyword extracting means 52, the service searching means 53 searches an associated message exchange system. The service searching means 53 may receive the keyword directly from the keyword extracting means 52, or may read out the keyword, which is stored in a storage section 60 (FIG. 3) by the keyword extracting means 52.

Note that, the service registration database above is connected to a carrier network, and it is only required to have data of keyword(s), each of which is associated with an address indicating location of data for causing the mobile phone 1 to function as a terminal device for the message exchange system, and the title of the message exchange system.

More specifically, the service registration database may be realized by a database provided by the message exchange service provider 8 shown in FIG. 2, which database is stored in a server device of the message exchange service provider 8, and includes keyword(s), each of which is associated with an address indicating location of data for causing the mobile phone 1 to function as a terminal device for a chat (blog) system, and the title of the chat (blog) system.

Further, the service registration database may be realized by so called a search engine which stores keyword(s) associated with an URI (Uniform Resource Identifier) indicating the location of data stored in a network connecting device connected to the Internet, and with the title of the data.

Further, the service searching means 53 transmits the obtained title to the menu displaying means 54. The menu displaying means 54 causes the display 42 to display a list of the title of The services acquired from the service searching means 53. This allows the user to visually confirm a list of services related to the program that he/she has been watching, thereby selecting arbitrary one(s).

Figures 13, 14:
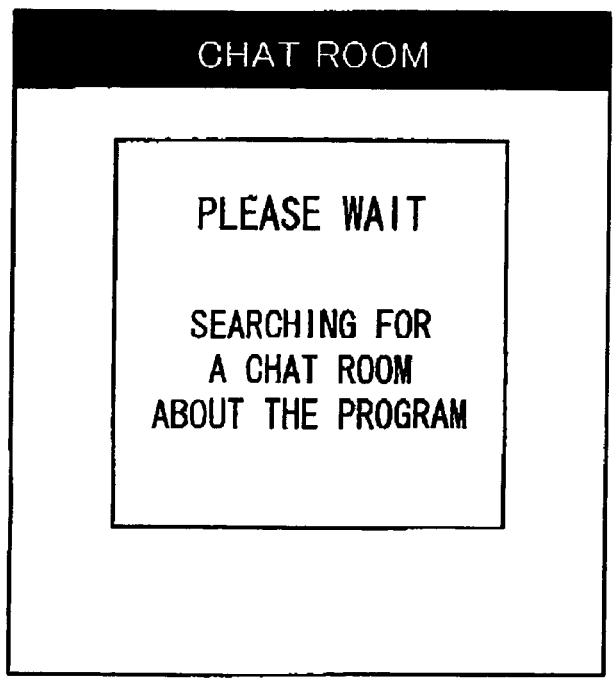
FIG. 13 is an explanatory diagram showing an example of a screen which displays a list of the titles of acquired chats.
FIG. 14 is an explanatory diagram showing a screen which informs a user that a searching process is being performed.

For example, in response to user's operation of pressing the chat start-up button 41c (FIG. 4), the service searching means 53 transmits a keyword to a chat registration database provided by a predetermined chat service provider, and acquires a title of chat related to the keyword among a plurality of chat systems provided by the chat service provider, and the address of the chat system. Then, the menu displaying means 54 causes the display 42 to display a list of the titles of the chat systems. FIG. 13 shows an example of a screen displayed in the display 42.

Note that, depending on either or both of the processing ability of mobile phone 1 and the chat registration database, or depending on the communication speed between the phone and the device having the data base, it may take a certain time period until the menu displaying means 54 completes the display of the list of titles of the chat system, after the user presses the chat start-up button 41c. In this case, it is preferable to display a screen to notify the user that the search is in progress. An example of the screen is shown in FIG. 14, Further, for example, in response to user's operation of pressing the blog start-up button 41d (FIG. 4), the service searching means 53 transmits a keyword to a blog registration database provided by a predetermined blog service provider, and acquires a title of blog related to the keyword among a plurality of blog systems provided by the blog service provider, and the address of the blog system. Then, the menu displaying means 54 causes the display 42 to display a list of the titles of the blog systems. FIG. 15 shows an example of a screen displayed in the display 42.

Then, when the user selects a title among the list of titles displayed in the display 42 after the titles are searched from the registration database based on a keyword extracted from the EPG data, the service searching means 53 acquires data indicated by the address corresponding to the title selected by the user, via a network. This allows the user to easily find a message exchange system related to the program which he/she has been watching, thereby immediately using a particularly preferable message exchange system.

Note that, the service searching means 53 may be arranged to store an address of acquired data into a predetermined storage section with the number of acquisitions. At this point, it is preferable that the menu displaying means 54 displays the title of the message exchange system having been acquired from the database in the display in a descending order of the frequency stored in the storage section. With this arrangement, the titles of the message exchange system may be aligned with priority so that a more frequently used message exchange system is displayed in a higher position of the list. This allows the user to more easily visually confirm frequently-used message exchange system, thereby more easily selecting a desired title.

Next, the following explains the character input assisting means 55 shown in FIG. 1. The character input assisting means 55 allows the user to easily input messages related to a program which he/she has been watching.

The control section 50 passes the flow to the character input assisting means 55 when a predetermined process for receiving character input by the user is requested during processing of the series of steps instructed by the user while a TV program is showing in the mobile phone 1. For example, when a predetermined process for receiving character input by the user is required during a series of steps started in response to pressing of the chat start-up button 41c by the user while a TV program is showing, the character input assisting means 55 starts its operation. Similarly, when a predetermined process for receiving input of content of article, title of the article, content of comment, and/or a title of the comment by the user is requested during a series of processes started in response to pressing of the blog start-up button 41d by the user while a TV program is showing, the character input assisting means 55 starts the operation. Further, when the user requests for input of e-mail, and/or the title of the e-mail during a series of processes started in response to pressing of the e-mail start-up button 41e (FIG. 4) by the user while a TV program is showing, the character input assisting means 55 starts the operation.

The following explains an operation of the character input assisting means 55. The character input assisting means 55 obtains a keyword from the keyword extracting means 52, and sends it to the menu displaying means 54. Then, the menu displaying means 54 causes the display 42 to display the keyword(s) as a keyword list in an input character string options display region 71 (FIG. 16; described later). Note that, the character input assisting means 55 may receive the keyword directly from the keyword extracting means 52, or may read out the keyword, which is stored in a storage section 60 by the keyword extracting means 52.

FIG. 16 shows an example of screen displayed in the step for asking input of article title to the user during the series of steps started in response to pressing of the blog start-up button 41d by the user. As shown in FIG. 16, the input character string options display region 71 is preferably provided in the vicinity of an article title display region 72 where the title of article is to be inputted. This allows the user to instantly realize the character strings displayed in the input character string options display region 71 are options to be used in inputting the title of article. The same display screen may be used for asking input of title of the comment to the user.

Figure 17:
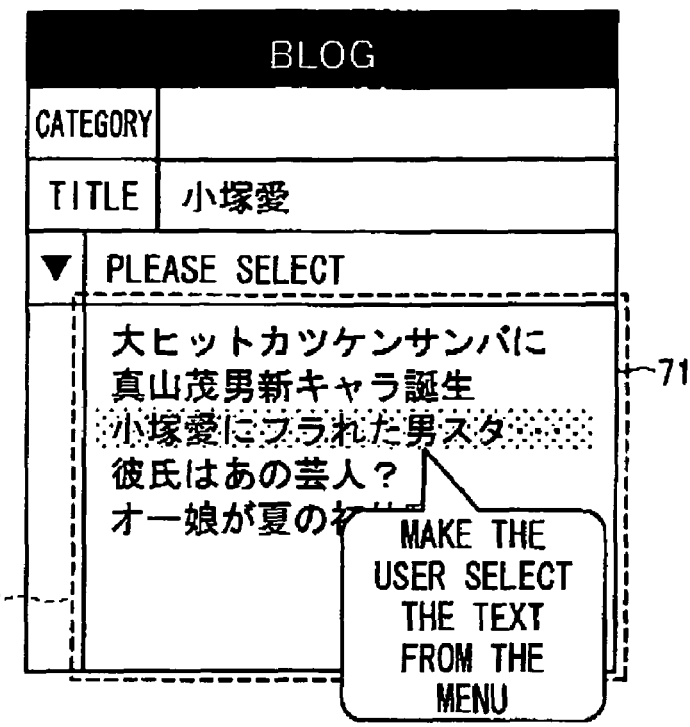
FIG. 17 is an explanatory diagram showing an example Of a screen which is displayed in a step of accepting a user's input of the body of an article.

FIG. 17 shows an example of screen displayed in the step for asking input of content of article to the user during the series of steps started in response to pressing of the blog start-up button 41d by the user. In this case, as shown in FIG. 17, the input character string options display region 71 is preferably provided in the vicinity of an article content display region 73 where the content of article is to be inputted. This allows the user to instantly realize the character strings displayed in the input character string options display region 71 are options to be used in inputting the content of article. The same display screen may be used for asking input of content of the comment to the user.

Figure 18:
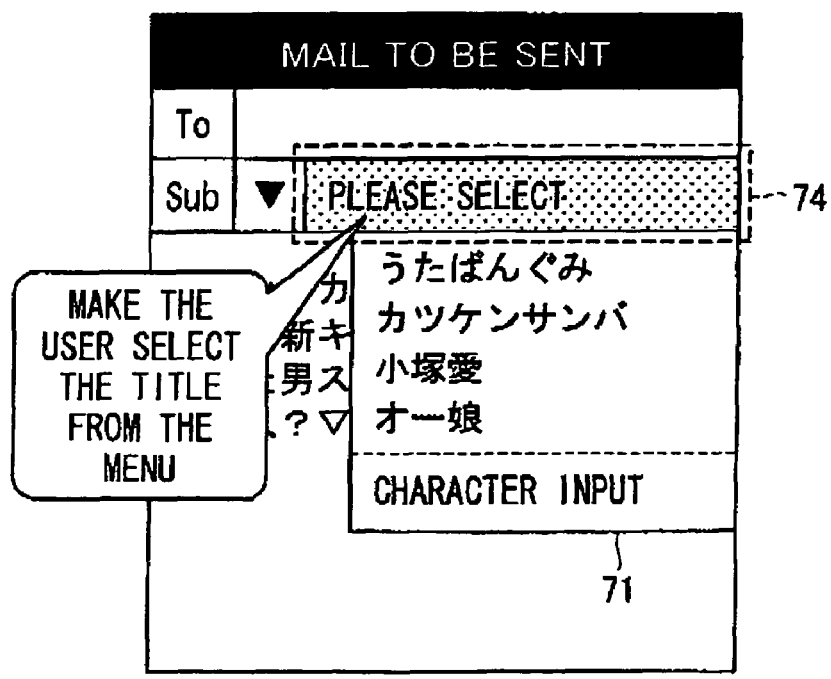
FIG. 18 is an explanatory diagram showing an example of a screen which is displayed in a step of accepting a user's input of the title of a mail.

FIG. 18 shows an example of screen displayed in the step for asking input of e-mail title to the user during the series of steps started in response to pressing of the mail start-up button 41e by the user. As shown in FIG. 18, the input character string options display region 71 is preferably provided in the vicinity of an e-mail title display region 74 where the title of e-mail is to be inputted. This allows the user to instantly realize the character strings displayed in the input character string options display region 71 are options to be used in inputting the title of e-mail.

Figure 19:
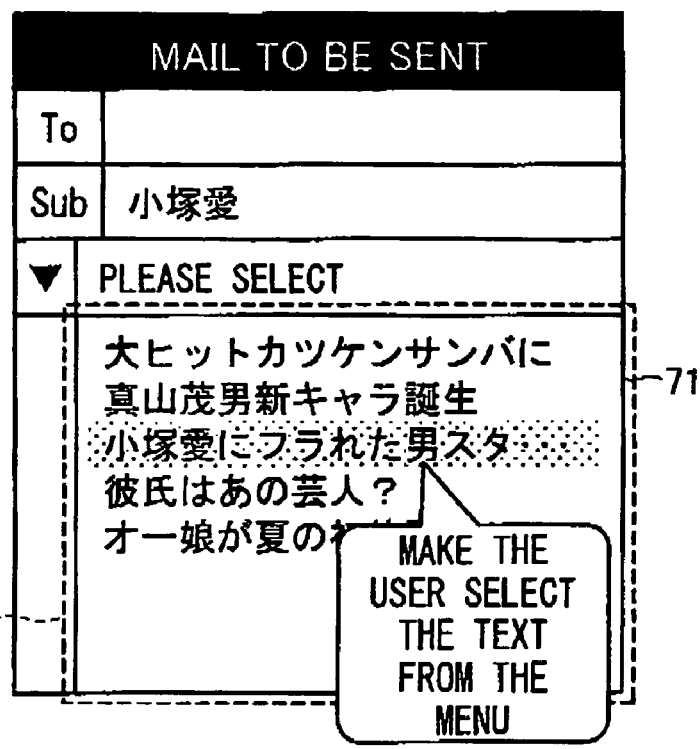
FIG. 19 is an explanatory diagram showing an example of a screen which is displayed in a step of accepting a user's input of the body of a mail.

FIG. 19 shows an example of screen displayed in the step for asking input of content of article to the user during the series of steps started in response to pressing of the e-mail start-up button 41e by the user. As shown in FIG. 19, the input character string options display region 71 is preferably provided in the vicinity of an e-mail content display region 75 where the content of e-mail is to be inputted. This allows the user to instantly realize the character strings displayed in the input character string options display region 71 are options to be used in inputting the content of e-mail.

As described, when the user selects one of the keywords from the keyword list displayed in the input character string options display region 71 after the keywords are extracted from the EPG data by the keyword extracting means 52, the character input assisting means 55 accepts the selected keyword as a user's choice. This allows the user to easily input a character string related to the program which he/she has been watching, without repeatedly pressing the character input key group 41a.

Note that, as shown in FIGS. 16 through 19, the menu displaying means 54 preferably displays a predetermined character string, such as "character input", in the input character string options display region 71 together with the keyword. Further, when the user selects this predetermined character string, the control section 50 is preferably stops operation of the character input assisting means 55, allowing the user to input other desired character string, for example, by pressing the character input key group 41a, in addition to the character strings displayed in the input character string options display region 71.

Note that, the character input assisting means 55 does not serve to limit post-editing of the character strings inputted through the foregoing manner by the user. That is, the character input assisting means 55 helps the user to more easily input characters, but does not limit the range of sentences or characters.

Next, the following explains a character-input converting means 56 and a predictive text entry dictionary section 57 (dictionary database) shown in FIG. 1. The character-input converting means 56 works with the predictive text entry dictionary section 57, and serves to convert a character string inputted by the user into a different character string previously associated with the inputted character string.

The character-input converting means 56 transmits a character string inputted by the user to the predictive text entry dictionary section 57.

The predictive text entry dictionary section 57 serves as a database storing a plurality of words, each of which is associated with the same word in Hiragana. When the input character string options display region 71 receives a Hiragana character string from the character-input converting means 56, it picks a word whose first part is identical in Hiragana to the character string, and sends it back to the character-input converting means 56.

The character-input converting means 56 transmits a Hiragana character string constituted of one or more character inputted by the user to the predictive text entry dictionary section 57, and receives from the predictive text entry dictionary section 57 a plurality of conversion options whose first part is identical to the inputted character string when written in Hiragana. For example, when the user inputs a character string 「ち」, the character-input converting means 56 transmits the character string 「ち」 to the predictive text entry dictionary section 57. Then, the character-input converting means 56 obtains from the predictive text entry dictionary section 57 a plurality of conversion options starting from 「ち」when written in Hiragana, such as "「ちょっと」「町」「中止」「調子」.

Figure 20:
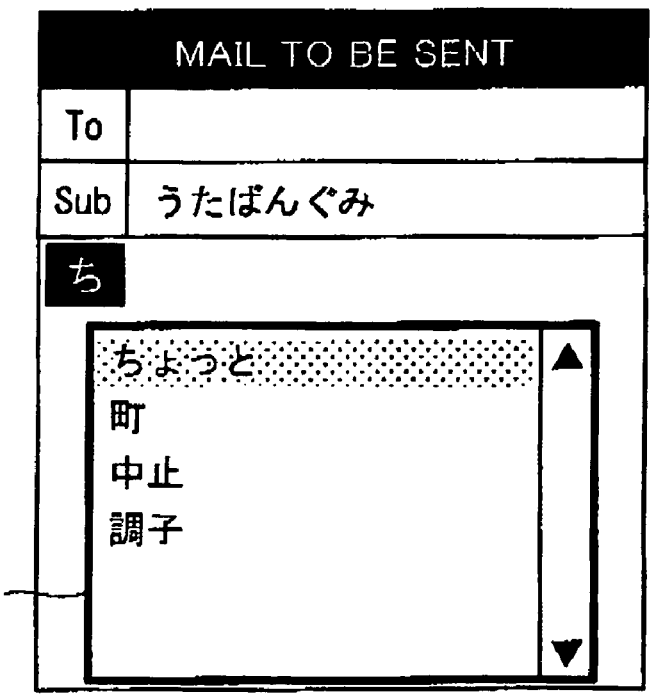
FIG. 20 is an explanatory diagram showing an example of a screen which displays a conversion options display region.

After that, the character-input converting means 56 transmits the group of conversion options to the menu displaying means 54. Then the menu displaying means 54 causes the display 42 to display a list of the group of conversion options in the conversion options display region 76 (described below). This allows the user to select a desired word from the list of conversion options. FIG. 20 shows an example of a screen showing the conversion options display region 76. With a display screen shown in FIG. 20, the user is allowed to easily select a desired word from the conversion options display region 76 which appears in response to the input of "「ち」".

When the user operates the key operation section 41 in a predetermined way so as to select a desired word among the conversion options, the control section 50 accepts the word as user's input. That is, the character-input converting means 56 realizes a function currently widely used in a mobile phone or the like, that is so-called a "conversion function from Hiragana/Katakana to Kanji" or "predictive text entry function".

Note that, as one of the important operations of the present invention, the character-input converting means 56 provided in the mobile phone 1 carries out storing of each keyword obtained from the keyword extracting means 52 by associating it with a specific character string, in addition to the foregoing operation. Specifically, the character-input converting means 56 adds the keywords to the predictive text entry dictionary section 57 in the following order.

1) a character string with a predetermined number of characters is cut out from the beginning of the keyword 2) the cut-out character string is compared with each word stored in the predictive text entry dictionary section 57

3) When the character string is matched with a word stored in the Hiragana/Katakana/Kanji conversion dictionary, the keyword is stored in the predictive text entry dictionary section 57 by being related with the corresponding word in hiragana. When the character string is not matched with any word in the Hiragana/Katakana/Kanji conversion dictionary, the last character of the character string is deleted and the process (2) is again performed.

The associated Hiragana string may be plural. For example, assuming that a word "「偽」"is extracted with respect to a search with a keyword "「偽ブランド」", this keyword "「偽ブランド」"can be associated with plural Hiragana strings, such as 「ぎ」「にせ」「いつわ」etc. In this case, the keyword "「偽ブランド」"comes up to the display as a conversion option when the user inputs a word 「ぎ」「に」「い」etc.

When the first part of the keyword is matched with a word stored in the character-input converting means 57, the first part of the keyword is associated with the same word in Hiragana, and is added to the Hiragana/Katakana/Kanji conversion dictionary by repeating the foregoing processes (1) through (3) until the registration is completed. Note that, when the keyword is started with a Hiragana character string, the Hiragana character string is cut out from the keyword, and is associated with the Hiragana string to be stored in the predictive text entry dictionary section 57.

With this operation, by the character-input converting means 56, of adding a keyword to the Hiragana/Katakana/ Kanji conversion dictionary, the user is allowed to easily input messages regarding the program he/she has been watching.

Figure 21:
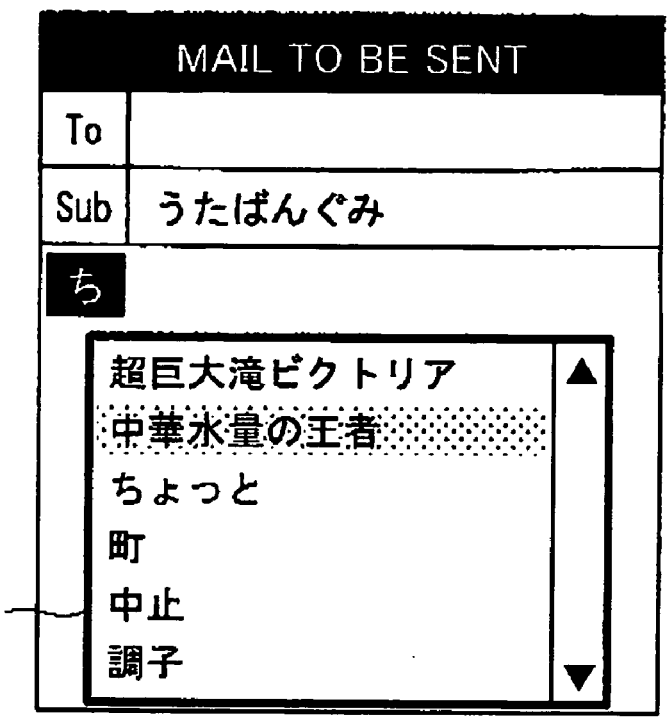
FIG. 21 is an explanatory diagram showing an example of the conversion options display region which is displayed by a menu displaying means in response to the user's input of a character(s).

FIG. 21 shows an example of screen showing the conversion options display region 76 displayed by the menu displaying means 54 in response to the user's input of "Chi" after the keyword generated in the processing shown in FIG. 10(c) is stored in the predictive text entry dictionary section 57. By thus adding the keyword extracted from EPG data of the program that he/she has been watching, the user can easily input a message regarding the program.

Figure 22:
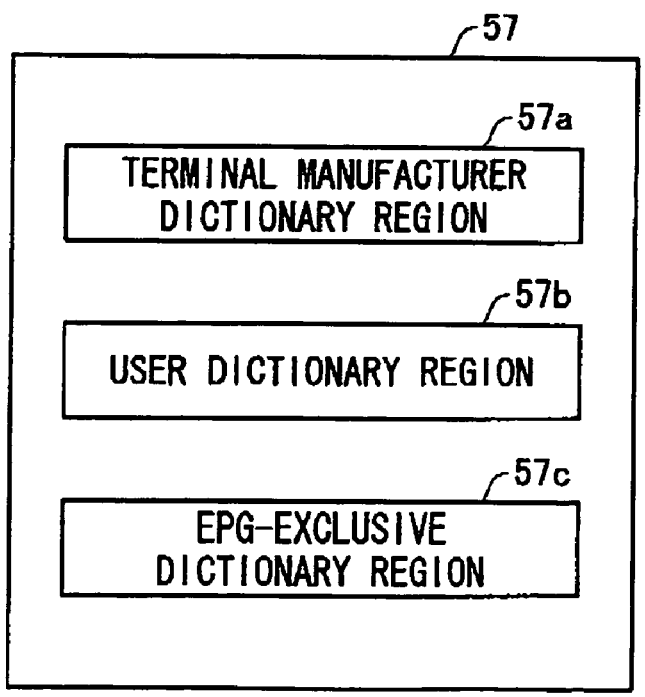
FIG. 22 is an explanatory diagram showing an example of dictionary areas of a predictive text entry dictionary section.

Note that, the predictive text entry dictionary section 57 may have a plurality of storage regions which separately carry out deletion/storage of words. More specifically, as shown in FIG. 22, the predictive text entry dictionary section 57 may include a manufacturer dictionary region 57a, an user dictionary region 57b, and an EPG-exclusive dictionary region (specific dictionary region) 57c.

Here, the manufacturer dictionary region 57a is a storage region for storing default words which are prepared at the stage of shipment. Further, the user dictionary region 57b is a storage region for allowing the user of the mobile phone 1 to freely add words. The EPG-exclusive dictionary region 57c is a storage region separated from the foregoing two storage regions, and is used for addition/deletion of words independently from the other storage regions.

In the mobile phone 1, the character-input converting means 56 preferably stores the keyword(s) obtained from the keyword extracting means 52 in the EPG-exclusive dictionary region 57c. With this arrangement, it becomes possible to individually treat the keywords stored in the EPG-exclusive dictionary region 57c, and the terms stored in other regions (the manufacturer dictionary region 57a and the user dictionary region 57b). In this manner, the keyword regarding a TV program do not come up as conversion options when the user intends to input usual sentences not relating to the program, and the input efficiency is not decreased.

Further, the menu displaying means 54 may displays the keywords stored in the EPG-exclusive dictionary region 57c before terms stored in other storage region (the manufacturer dictionary region 57a, the user dictionary region 57b). This allows the user to easily find a keyword regarding the program which he/she has been watching, thereby more easily inputting messages regarding the program which he/she has been watching.

Further, the character-input converting means 56 may delete the keyword(s) stored in the EPG-exclusive dictionary region 57c before storing a new keyword(s) obtained by the keyword extracting means 52 in the EPG-exclusive dictionary region 57c. In other words, the character-input converting means 56 may store the keywords in the EPG-exclusive dictionary region 57c in an overwriting manner. With this arrangement, the extracted keywords are stored continuously in the EPG-exclusive dictionary region 57c, thereby preventing the old keywords (regarding the program which the user watched before) from interfering input of message regarding the program which the user has been watching.

Note that, in the foregoing explanation, the character-input converting means 56 transmits the Hiragana character string inputted by the user to the predictive text entry dictionary section 57, and acquires a plurality of conversion options, whose first part corresponds to the term when written in Hiragana, from the predictive text entry dictionary section 57; however, the present invention is not limited to this. For example, it may be arranged so that an alphabet character string inputted by the user is transmitted to the predictive text entry dictionary section 57 so as to acquire an English word starting from the alphabet. In this case, the English word is associated with the alphabet in the predictive text entry dictionary section 57.

The following specifically explains a flow using a combination of the foregoing means. In the following, the explanation is made for each case of a chat, a blog and e-mail.

Figure 23:
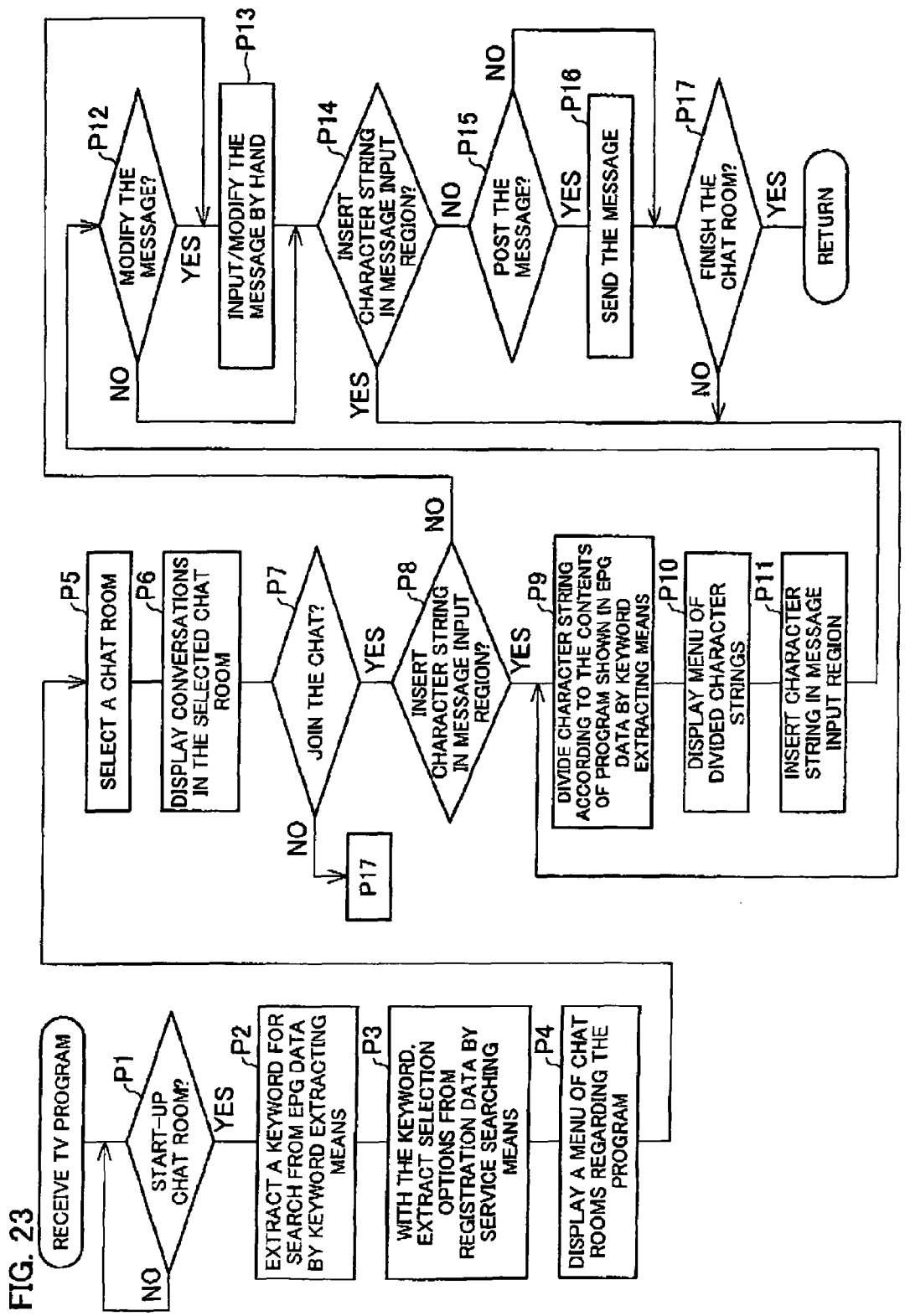
FIG. 23 is a flow chart showing an example of steps from a step of starting a chat while a user is watching TV to a step of finishing the chat.

First, the following explains a flow using a chat system with reference to FIG. 23. FIG. 23 is a flow chart showing a specific example of a preferable operation, which starts from user's operation for starting chat while he/she is watching TV, and finishes at user's operation for finishing the chat.

In response to user's operation of pressing the chat start-up button 41c while the mobile phone 1 is receiving TV, the EPG data acquiring means 51 acquires the EPG data of the program currently running (Process P1: program information acquiring process).

The EPG data acquiring means 51 transmits the acquired EPG data to the keyword extracting means 52, and also stores the EPG data in the storage section 60 at the same time. After receiving the EPG data, the keyword extracting means 52 extracts a keyword for searching a chat from the EPG data (Process P2: keyword extracting process).

Next, the keyword extracting means 52 transmits the extracted keyword to the service searching means 53. The service searching means 53 then transmits the keyword to the chat system registration database via a carrier network so as to obtain an address and a title of chat which are related to the keyword in the database (Process P3: search process).

After acquiring the address and the title of chat, the service searching means 53 transmits the title to the menu displaying means 54. At the same time, the menu displaying means 54 stores the address in the storage section 60. The menu displaying means 54 displays the title, if a plurality of the titles are acquired, a list of the titles, in the display 42 (Process P4: title options displaying process).

After the process P4 is finished, the service searching means 53 stands by until the user selects one of the titles in the list (Process P5).

When the user selects one of the titles in the list, the service searching means 53 reads out the address of the selected title from the storage section 60, and downloads data indicated by the address via a carrier network (data receiving process). Then, the service searching means 53 executes the downloaded program code to start a chat (Process: P6).

Note that, the program code downloaded in Process P6 realizes all control functions required for causing the mobile phone 1 to serve as a terminal device of a chat system. Therefore, the following operation carries out the respective steps by the control section 50, which are developed by the foregoing program code, in addition to the processes performed by the respective components of the control section 50 shown in FIG. 1.

When a chat is started, the service searching means 53 controls the control section 50 so that the control section 50 causes the display 42 to display a screen with an appropriate character string, such as, "Do you want to Join a chat?", and stands by until the user makes a response to join/not join a chat (Process: P7). The respective means 51 through 56 constituting the control section 50 finish the series of operation when the user operates the key operation section 41 in a specific way, indicating that he/she is not going to join a chat (Process: P17).

In process P7, when the user selects to join a chat, the character input assisting means 55 causes the display 42 to display a screen with an appropriate character string, such as, "Do you want to input a message regarding the program?", and stands by until the user makes a response to input/not input a keyword extracted from the EPG data (Process: P8). When the user selects not to input a keyword extracted from the EPG data by operating the key operation section 41 in a specific way, the control section 50 stands by until the user inputs characters with a general operation (Process P13).

On the other hand, in Process P8, when the user selects to input a keyword extracted from the EPG data, the keyword extracting means 52 extracts a keyword for character input from the EPG data stored in the storage section 60. Then, the keyword extracting means 52 transmits the keyword to the character input assisting means 55 (Process P9: keyword extracting operation). As described later, the keyword extracted here is used for input of message by the user in a chat system. Since the content of the user's message assumably relates to the program, it is preferable, in the keyword extraction operation in process P9, to extract a keyword from a character string describing the program in the EPG data.

The character input assisting means 55 transmits the acquired keyword to the menu displaying means 54. The menu displaying means 54 displays the keyword, when the keyword is plural, a list of keywords, in the input character string options display region 71 of the display 42 (Process P10: displaying operation).

When the process P10 is finished, the character input assisting means 55 stands by until the user selects the keyword. When the user selects one keyword, the character input assisting means 55 accepts a keyword as an input character string given by the user (character string input operation). Then, the control section 50 displays the character string inputted by the user, in an appropriate message input region provided in a display screen (Process P11).

When the display of keyword selected by the user in the message input region is completed, the control section 50 causes the display 42 to display a screen with an appropriate character string, such as, "Do you want to modify the message?", and stands by until the user makes a response to modify/not modify the character string having been inputted to the message input region (Process: P12). When the user selects not to modify the message by operating the key operation section 41 in a specific way, Process P14 (described later) is carried out.

In process P12, when the user selects to modify the message by operating the key operation section 41 in a specific way, the control section 50 stands by for user's input of characters through the general operation of the key operation section 41. In this state, the user can arbitrarily edit the character string having been inputted in the message input region (Process P13). When the user completes a desired character input, and operates the key operation section 41 in a specific way for indicating that the character input is completed, the character input assisting means 55 controls the menu displaying means 54 so that the menu displaying means 54 causes the display 42 to display a screen with an appropriate character string, such as, "Do you want to continue input?", and stands by until the user makes a response to continue/not continue the input of characters to the message input region (Process: P14). When the user selects to continue the input of characters by operating the key operation section 41 in a specific way, the control section 50 repeats the flow from Process P9.

On the other hand, when the user selects not to continue the input of characters on Process P14, the control section 50 causes the display 42 to display a screen with an appropriate character string, such as, "Send the message?", and stands by until the user makes a response to send/not send the character string inputted to the message input region (Process: P15). When the user selects not to send the message by operating the key operation section 41 in a specific way, Process P17 (described later) is carried out. Meanwhile, when the user selects to send the message, the control section 50 transmits the character string having been inputted to the message input region to the server device via the wireless communication section 20 (Process P16).

In Process P17, the control section 50 causes the display 42 to display an appropriate character string, such as "Finish?" or the like, and stands by until the user makes a response to finish/not finish the chat. When the user selects to finish the chat by operating the key operation section 41 in a specific way, the respective means 51 through 56 constituting the control section 50 finish the series of operation. On the other hand, when the user selects not to finish the chat, the foregoing flow is repeated from Process: P9.

Next, the following explains the case of a blog. With the foregoing structure, the mobile phone 1 allows the user to easily select a blog related to the program that he/she has been watching, and post a comment regarding the program to the blog. Further, the foregoing structure of the mobile phone 1 also allows the user to post a new article regarding the program, that he/she has been watching, to a blog owned by the user.

The mobile phone 1 allows the user to post a comment to a blog owned by other user, and also to post a new article to a blog owned by himself/herself. Then, in response to user's operation of pressing the blog start-up button 41d to start the blog, the control section 50 displays a screen shown in FIG. 24. The screen shown in FIG. 24 shows some character strings, such as "Post new article", and "Browse new article", allowing the user to post a new article, or browse a blog related to the program that he/she has been watching.

Figure 24:
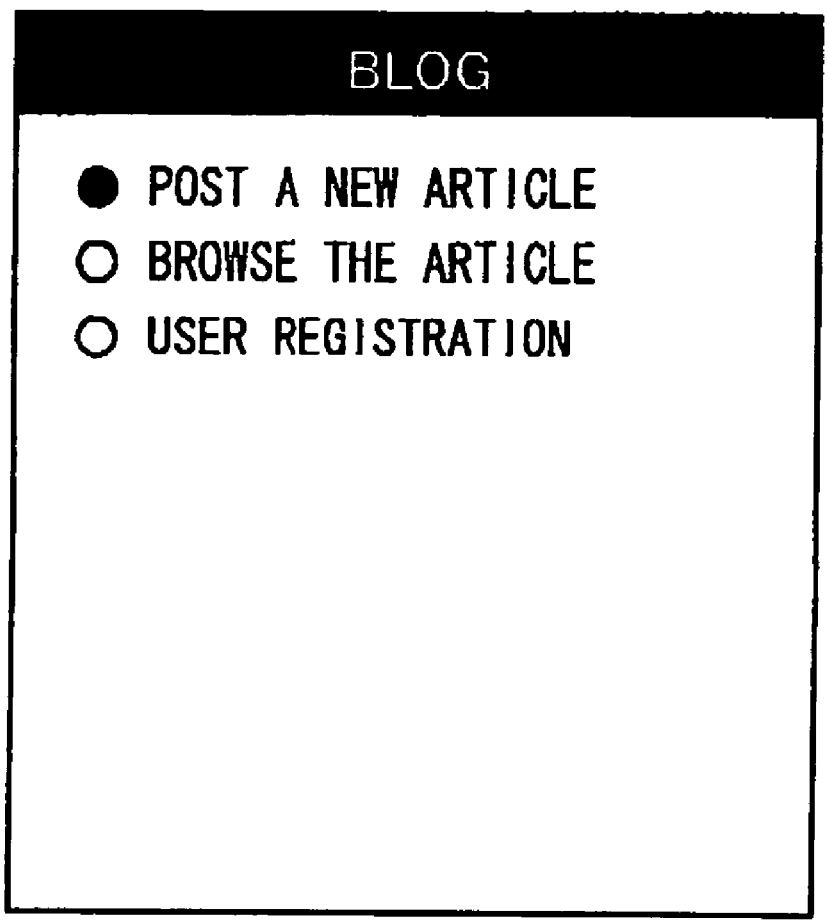
FIG. 24 is an explanatory diagram showing an example of a screen which is displayed when a user presses a blog start-up button to start using the blog.
Figure 25:
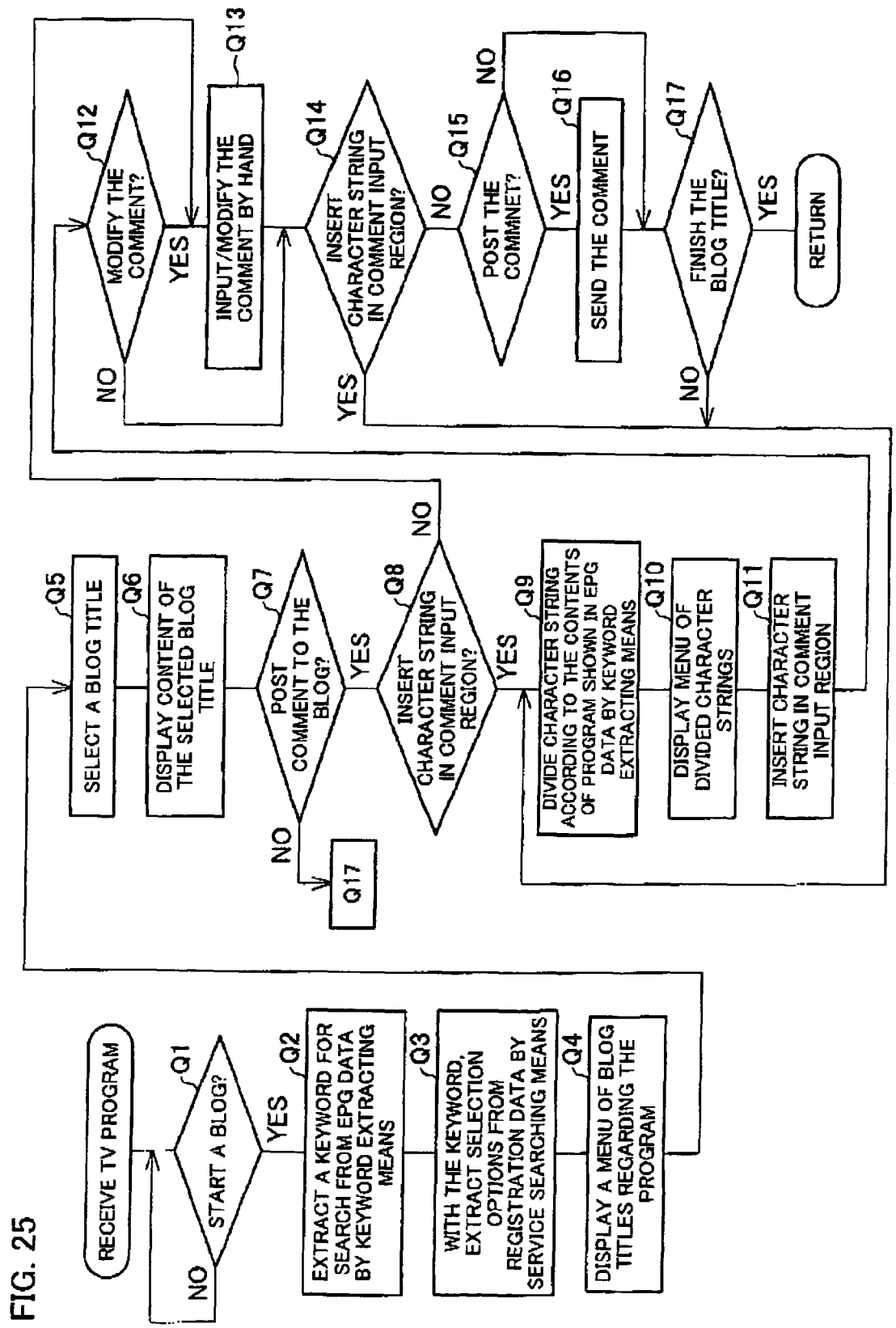
FIG. 25 is a flow chart showing an example of steps of allowing a user to search a blog regarding a program which he/she has been watching and to post a comment regarding the program.
Figure 26:
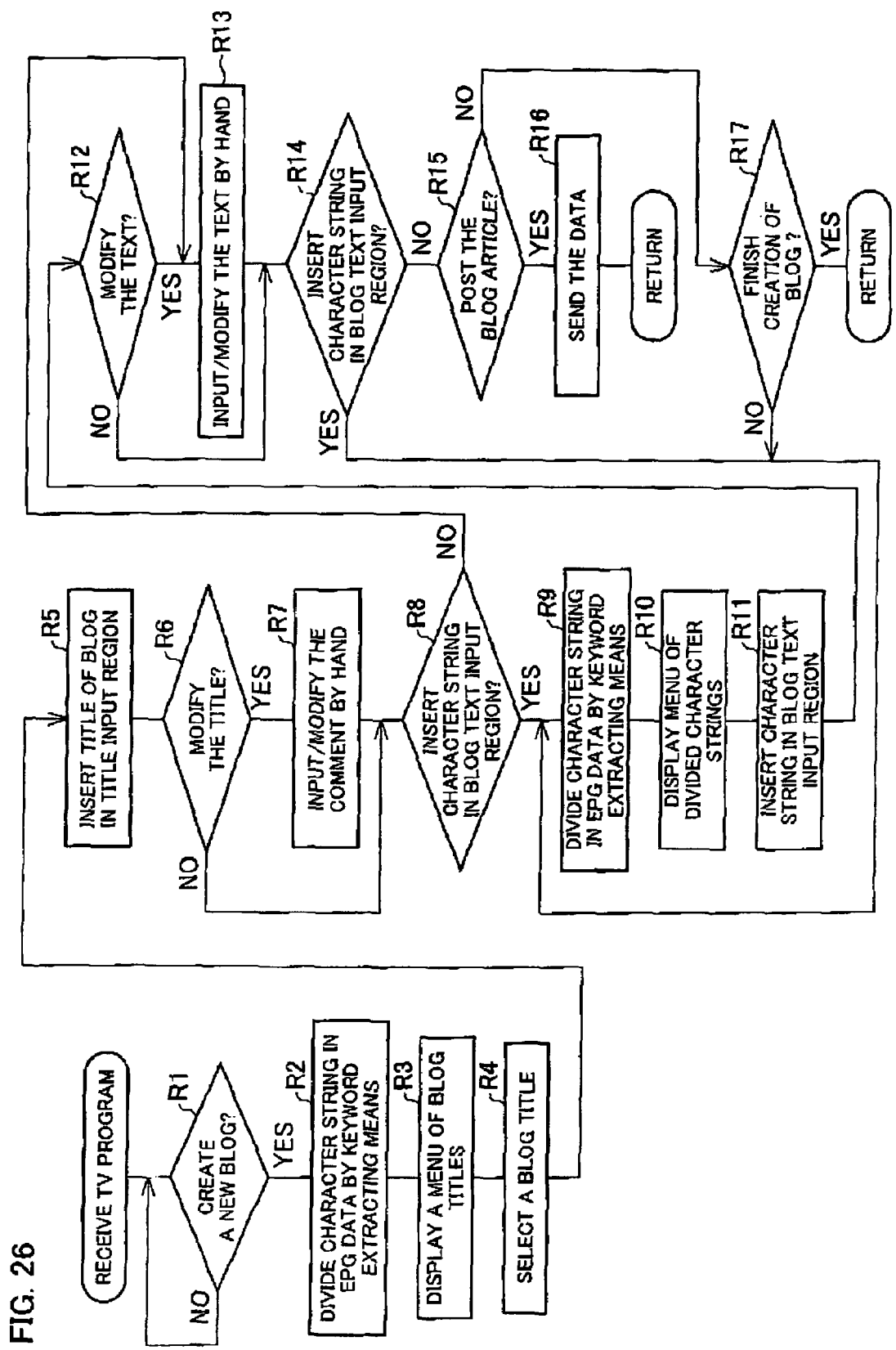
FIG. 26 is a flow chart showing an example of steps of allowing a user to post a new article regarding a program which he/she has been watching.

With reference to the display screen shown in FIG. 24, the following explains an operation after the user selects to browse the blog regarding the program that he/she has been watching. This operation is explained by referring to FIG. 25, which is a flow chart as a specific example of an operation flow carried out after the user selects to browse a blog.

When the user selects to browse an article regarding the program that he/she has been watching, the EPG data acquiring means 51 acquires EPG data of the program currently running (Process Q1: Program information acquiring process).

After acquiring the EPG data, the EPG data acquiring means 51 transmits the EPG data to the keyword extracting means, and stores the data in the storage section 60 at the same time The keyword extracting means 52 receives the EPG data and extracts a keyword for searching a blog from the EPG data (Process Q2: keyword extracting process).

The keyword extracting means 52 transmits the extracted keyword to the service searching means 53. The service searching means 53 transmits the keyword to a blog system registration database via a carrier network, and acquires an address and a title of a blog associated with the keyword (Process Q3: searching process).

After acquiring the address and the title of blog, the service searching means 53 transmits the title to the menu displaying means 54. At the same time, the menu displaying means 54 stores the address in the storage section 60. The menu displaying means 54 displays the title, if a plurality of the titles are acquired, a list of the titles, in the display 42 (Process Q4: displaying process).

After the process Q4 is finished, the service searching means 53 stands by until the user selects one of the titles in the list (Process Q5).

When the user selects one of the titles in the list, the service searching means 53 reads out the address of the selected title from the storage section 60, and downloads HTML data indicated by the address via a carrier network (data receiving process). Then, the service searching means 53 modifies the downloaded HTML data to start a blog (Process: Q6).

Note that, the HTML data downloaded in Process Q6 realizes all control functions performed by the control section 50, which are required for causing the mobile phone 1 to serve as a terminal device of a blog system. Therefore, the following operation carries out the respective steps by the control section 50, which are developed by the foregoing HTML data or the other program code, in addition to the processes performed by the respective components of the control section 50 shown in FIG. 1.

When a blog page is displayed, the service searching means 53 causes the control section 50 to display a screen in the display 42 with an appropriate wording, such as "post a comment?" or the like, and stands by until the user gives instruction for posting/not posting a comment (Q7). When the user operates the key operation section in a specific way to select not to post a comment, the respective means 51 through 56 constituting the control section 50 finish the series of operation (Process Q17).

When the user carries out the predetermined operation to post a comment, the character input assisting means 55 causes the display 42 to display a screen with an appropriate character string, such as, "Do you want to input a message regarding the program?", and stands by until the user makes a response to input/not input a keyword extracted from the EPG data (Process: Q8). When the user selects not to input a keyword extracted from the EPG data by operating the key operation section 41 in a specific way, the control section 50 stands by until the user inputs characters with a general operation (Q13).

On the other hand, in Process Q8, when the user selects to input a keyword extracted from the EPG data, the keyword extracting means 52 extracts a keyword for character input from the EPG data stored in the storage section 60 (Keyword extracting operation: Process Q9). Then, the keyword extracting means transmits a keyword to the character input assisting means 55. As described later, the keyword extracted here is used for input of comment by the user in a blog system. Since the content of the user's message assumably relates to the program, it is preferable, in the keyword extraction operation in process Q9, to extract a keyword from a character string describing the program in the EPG data.

The character input assisting means 55 transmits the acquired keyword to the menu displaying means 54. The menu displaying means 54 displays the keyword, when the keyword is plural, a list of keywords, in the input character string options display region 71 of the display 42 (Process Q10: displaying operation).

When the process Q9 is finished, the character input assisting means 55 stands by until the user selects a keyword. When the user selects one keyword, the character input assisting means 55 accepts the keyword as an input character string given by the user (character string input operation). Then, the control section 50 displays the character string inputted by the user, in an appropriate comment input region provided in a display screen (Process Q11).

When the display of keyword selected by the user in the comment input region is completed, the control section 50 causes the display 42 to display a screen with an appropriate character string, such as, "Do you want to modify the comment?", and stands by until the user makes a response to modify/not modify the character string having been inputted to the comment input region (Process: Q12). When the user selects not to modify the message by operating the key operation section 41 in a specific way, Process Q14 (described later) is carried out.

In process Q12, when the user selects to modify the comment by a specific operation, the control section 50 stands by for user's input of characters through the general operation. In this state, the user can arbitrarily edit the character string having been inputted in the comment input region (Process Q13).

When the user completes a desired character input, and operates the key operation section 41 in a specific way for indicating that the character input is completed, the character input assisting means 55 controls the menu displaying means 54 so that the menu displaying means 54 causes the display 42 to display a screen with an appropriate character string, such as, "Do you want to continue input?", and stands by until the user makes a response to continue/not continue the input of characters to the comment input region (Process: P14). When the user selects to continue the input of characters by operating the key operation section 41 in a specific way, the control section 50 repeats the flow from Process P9.

On the other hand, when the user selects not to continue the input of characters on Process P14, the control section 50 causes the display 42 to display a screen with an appropriate character string, such as, "Post the comment?", and stands by until the user makes a response to send/not send the comment inputted to the comment input region (Process: Q15). When the user selects not to send the comment by operating the key operation section 41 in a specific way, Process Q17 (described later) is carried out. Meanwhile, when the user selects to send the comment, the control section 50 transmits the character string having been inputted to the comment input region to the server device (Process Q16).

In Process Q17, the control section 50 causes the display 42 to display an appropriate character string, such as "Finish?" or the like, and stands by until the user makes a response to finish/not finish the blog. When the user selects to finish the blog by operating the key operation section 41 in a specific way, the control section 50 finishes the series of operation. On the other hand, when the user selects not to finish the blog, the foregoing flow is repeated from Process: Q19.

With reference to the display screen shown in FIG. 24, the following explains an operation after the user selects to post a new article regarding the program that he/she has been watching. This operation is explained by referring to FIG. 26.

When the user selects to post a new article regarding the program he/she has been watching, according to the screen shown in FIG. 24, the control section 50 reads out the URI of the blog owned by the user from the storage section 60 (FIG. 3), and downloads HTML data. Then, the control section 50 causes the display 42 to display an "article input screen" for allowing the user to input an article, based on the HTML data downloaded. Therefore, the following operation carries out the respective steps by the control section 50, which are developed by the foregoing HTML data, in addition to the processes performed by the respective components of the control section 50 shown in FIG. 1.

The article input screen includes a title input region and a text input region. The title input region is a display region for a character string inputted as a title of article by the user. Further, the text input region is a display region for characters inputted as text of article by the user. With reference to the flow chart shown in FIG. 26, the following explains a preferable example of an operation flow after the foregoing screen appeared.

When the user selects to post a new article regarding the program that he/she has been watching, the EPG data acquiring means 51 acquires EPG data of the program currently running (Process R1: Program information acquiring process).

After acquiring the EPG data, the EPG data acquiring means 51 transmits the EPG data to the keyword extracting means 52, and stores the data in the storage section 60 at the same time. The keyword extracting means 52 receives the EPG data and extracts a keyword for inputting a character string from the EPG data (Process R2: keyword extracting process). The keyword extracting means 52 transmits the keyword to the character input assisting means 55. The keyword extracted here is used as an option of title of article.

The character input assisting means 55 transmits the acquired keyword to the menu displaying means 54. The menu displaying means 54 displays the keyword, when the keyword is plural, a list of keywords, in the input character string options display region 71 of the display 42 (Process R3: displaying operation).

When the process R3 is finished, the character input assisting means 55 stands by until the user selects a keyword (Process R4). When the user selects one keyword, the character input assisting means 55 accepts the keyword as an input character string given by the user (character string input operation).

Then, the control section 50 displays the character string inputted by the user, in an appropriate title input region provided in a display screen (Process R5). When the display of keyword selected by the user in the title input region is completed, the control section 50 causes the display 42 to display a screen with an appropriate character string, such as, "Do you want to modify the title?", and stands by until the user makes a response to modify/not modify the character string having been inputted to the title input region (Process R6). When the user selects not to modify the title, Process R8 (described later) is carried out.

In process R6, when the user selects to modify the comment by a specific operation, the control section 50 stands by for user's input of characters through the general operation. In this state, the user can arbitrarily edit the character string having been inputted in the title input region (Process R7).

When the user completes a desired character input, and selects the text input region to start inputting the text of article, the character input assisting means 55 causes the display 42 to display a screen with an appropriate character string, such as, "Do you want to input an article regarding the program?", and stands by until the user makes a response to input/not input a keyword extracted from the EPG data (Process: R8). When the user selects not to input the keyword extracted from the EPG data by a specific operation, the control section 50 stands by until the user inputs characters with a general operation.

On the other hand, in Process R8, when the user selects to input a keyword extracted from the EPG data, the keyword extracting means 52 extracts a keyword for character input from the EPG data stored in the storage section 60 (Process R9: keyword extracting operation). Then, the keyword extracting means 52 transmits a keyword to the character input assisting means 55. As described later, the keyword extracted here is used for input of article by the user in a blog system. Since the content of the user's article assumably relates to the program, it is preferable, in the keyword extraction operation in process R9, to extract a keyword from a character string describing the program in the EPG data.

The character input assisting means 55 transmits the acquired keyword to the menu displaying means 54. The menu displaying means 54 displays the keyword, when the keyword is plural, a list of keywords, in the input character string options display region 71 of the display 42 (Process R10: displaying operation).

When the process R9 is finished, the character input assisting means 55 stands by until the user selects a keyword. When the user selects one keyword, the character input assisting means 55 accepts the keyword as an input character string given by the user (character string input operation). Then, the control section 50 displays the character string inputted by the user, in the text input region (Process R11).

When the display of keyword selected by the user in the text input region is completed, the character input assisting means causes the display 42 to display a screen with an appropriate character string, such as, "Do you want to modify the comment?", and stands by until the user makes a response to modify/not modify the character string having been inputted to the text input region (Process: R12). When the user selects not to modify the comment by a specific operation, Process R14 (described later) is carried out.

In process R12, when the user selects to modify the comment by a specific operation, the control section 50 stands by for user's input of characters through the general operation. In this state, the user can arbitrarily edit the character string having been inputted in the text input region (Process R13).

When the user completes a desired character input, and operates the key operation section 41 in a specific way for indicating that the character input is completed, the character input assisting means 55 causes the display 42 to display a screen with an appropriate character string, such as, "Do you want to continue input?", and stands by until the user makes a response to continue/not continue the input of characters to the text input region (Process: R14). When the user selects to continue the input of characters by operating the key operation section 41 in a specific way, the control section 50 repeats the flow from Process R9.

On the other hand, when the user selects not to continue the input of characters on Process R14, the control section 50 causes the display 42 to display a screen with an appropriate character string, such as, "Post the article?", and stands by until the user makes a response to send/not send the text inputted to the text input region (Process: R15). When the user selects not to send the comment by a specific operation, Process R17 (described later) is carried out. Meanwhile, when the user selects to send the comment, the control section 50 transmits the character strings having been inputted to the text input region to the server device and to the text input region (Process R16), and then finishes the operation.

In Process R17, the control section 50 causes the display 42 to display an appropriate character string, such as "Finish?" or the like, and stands by until the user makes a response to finish/not finish the blog. When the user selects to finish the blog by operating the key operation section 41 in a specific way, the control section 50 finishes the series of operation. On the other hand, when the user selects not to finish the blog, the foregoing flow is repeated from Process R19.

Figure 27:
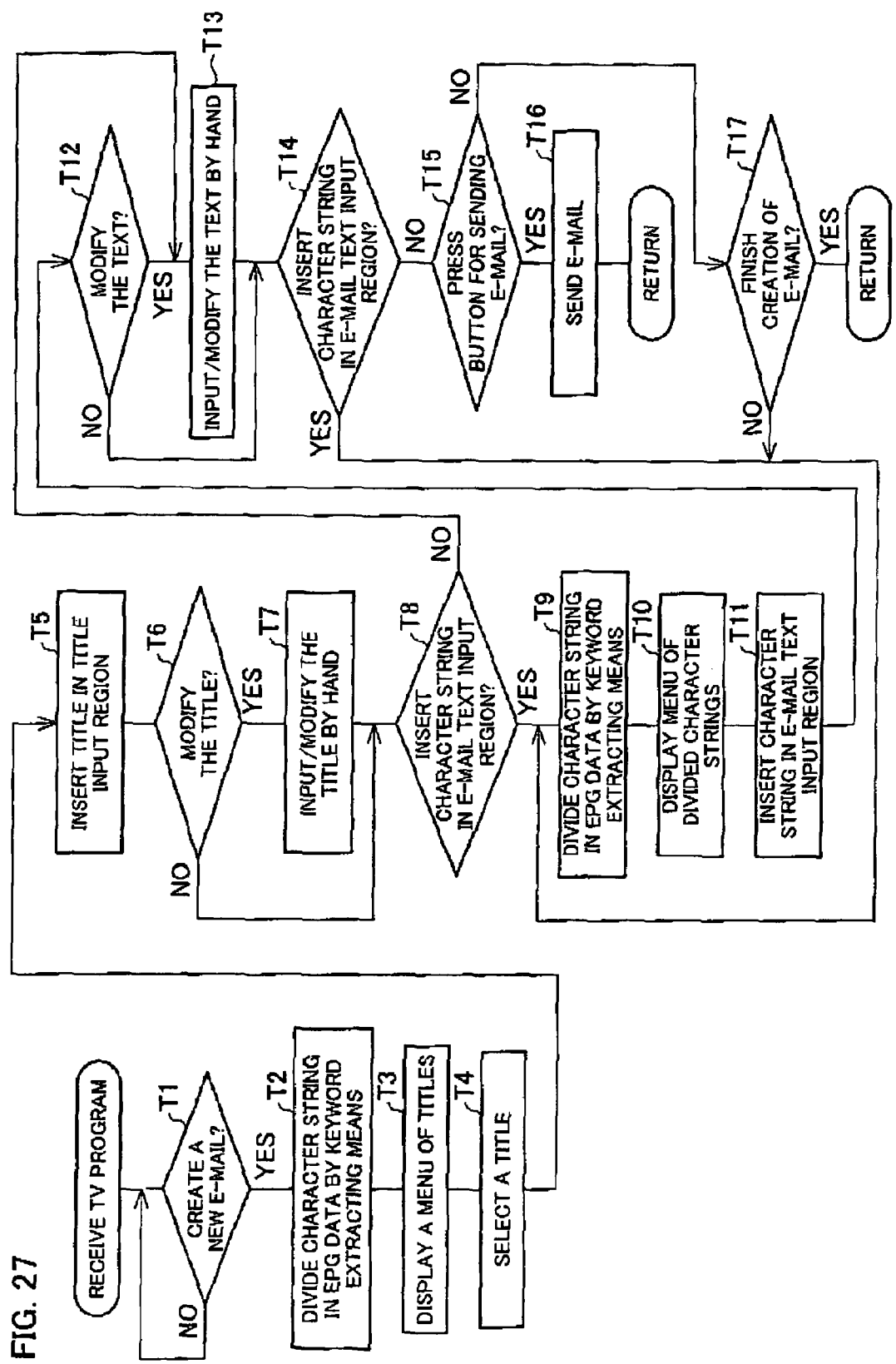
FIG. 27 is a flow chart showing an example of steps of allowing a user to start using a new mail regarding a program which he/she has been watching.

Finally, the following explains an operation for accessing an e-mail service, based on FIG. 27.

The mobile phone 1 allows the user to easily write a message related to the program that he/she has been watching. In response to user's operation for accessing an e-mail service by pressing the mail start-up button 41e, the mobile phone 1 downloads a program for enabling a mail function. The control section 50 executes commands of the downloaded program, and causes the display 42 to display a screen for allowing the user to input an e-mail. Therefore, the following operation carries out the respective steps by the control section 50, which are developed by the foregoing program, in addition to the processes performed by the respective components of the control section 50 shown in FIG. 1.

The mail input screen includes a title input region and a text input region The title input region is a display region for a character string inputted as a title of e-mail by the user. Further, the text input region is a display region for characters inputted as text of mail by the user.

With reference to the flow chart shown in FIG. 27, the following explains a preferable example of an operation flow after the foregoing screen appeared.

When the user selects to write an e-mail regarding the program that he/she has been watching, the EPG data acquiring means 51 acquires EPG data of the program currently running (Process T1: Program information acquiring process).

After acquiring the EPG data, the EPG data acquiring means 51 transmits the EPG data to the keyword extracting means, and stores the data in the storage section 60 at the same time. The keyword extracting means 52 receives the EPG data and extracts a keyword for inputting a character string from the EPG data (Process T2: keyword extracting process). The keyword extracting means 52 transmits the keyword to the character input assisting means 55. The keyword extracted here is used as an option of title of mail.

The character input assisting means 55 transmits the acquired keyword to the menu displaying means 54. The menu displaying means 54 displays the keyword, when the keyword is plural, a list of keywords, in the input character string options display region 71 of the display 42 (Process T3: displaying operation).

When the process T3 is finished, the character input assisting means 55 stands by until the user selects a keyword (Process T4). When the user selects one keyword, the character input assisting means 55 accepts the keyword as an input character string given by the user (character string input operation).

Then, the control section 50 displays the character string inputted by the user, in an appropriate title input region provided in a display screen (Process T5).

When the display of keyword selected by the user in the title input region is completed, the control section 50 causes the display 42 to display a screen with an appropriate character string, such as, "Do you want to modify the title?", and stands by until the user makes a response to modify/not modify the character string having been inputted to the title input region (Process T6). When the user selects not to modify the title, Process T8 (described later) is carried out.

In process T6, when the user selects to modify the comment by a specific operation, the control section 50 stands by for user's input of characters through the general operation. In this state, the user can arbitrarily edit the character string having been inputted in the title input region (Process T7).

When the user completes a desired character input, and selects the text input region to start inputting the text of e-mail, the character input assisting means 55 causes the display 42 to display a screen with an appropriate character string, such as, "Do you want to input an e-mail regarding the program?", and stands by until the user makes a response to input/not input a keyword extracted from the EPG data (Process: T8). When the user selects not to input the keyword extracted from the EPG data by a specific operation, the control section 50 stands by until the user inputs characters with a general operation.

On the other hand, in Process T8, when the user selects to input a keyword extracted from the EPG data, the keyword extracting means 52 extracts a keyword for character input from the EPG data stored in the storage section 60 (Process T9: keyword extracting operation). Then, the keyword extracting means transmits the keyword to the character input assisting means 55. As described later, the keyword extracted here is used for input of e-mail by the user in an e-mail system. Since the content of the e-mail assumably relates to the program, it is preferable, in the keyword extraction operation in process T9, to extract a keyword from a character string describing the program in the EPG data.

The character input assisting means 55 transmits the acquired keyword to the menu displaying means 54. The menu displaying means 54 displays the keyword, when the keyword is plural, a list of keywords, in the input character string options display region 71 of the display 42 (Process T10: displaying operation).

When the process T9 is finished, the character input assisting means 55 stands by until the user selects a keyword. When the user selects one keyword, the character input assisting means 55 accepts the keyword as an input character string given by the user (character string input operation). Then, the control section 50 displays the character string inputted by the user, in the text input region (Process T11).

When the display of keyword selected by the user in the text input region is completed, the character input assisting means 55 causes the display 42 to display a screen with an appropriate character string, such as, "Do you want to modify the text?", and stands by until the user makes a response to modify/not modify the character string having been inputted to the text input region (Process: T12). When the user selects not to modify the comment by a specific operation, Process T14 (described later) is carried out.

In process T12, when the user selects to modify the comment by a specific operation, the control section 50 stands by for user's input of characters through the general operation. In this state, the user can arbitrarily edit the character string having been inputted in the text input region (Process R13).

When the user completes a desired character input, and operates the key operation section 41 in a specific way for indicating that the character input is completed, the character input assisting means 55 causes the display 42 to display a screen with an appropriate character string, such as, "Do you want to continue input?", and stands by until the user makes a response to continue/not continue the input of characters to the text input region (Process: T14). When the user selects to continue the input of characters by operating the key operation section 41 in a specific way, the control section 50 repeats the flow from Process T9.

On the other hand, when the user selects not to continue the input of characters on Process T14, the control section 50 causes the display 42 to display a screen with an appropriate character string, such as, "Send e-mail?", and stands by until the user makes a response to send/not send the text inputted to the title input region (Process. T15). When the user selects not to send the e-mail by a specific operation, Process T17 (described later) is carried out. Meanwhile, when the user selects to send the e-mail, the control section 50 transmits the e-mail which has the character strings having been inputted to the text input region and to the text input region, to the server device (Process T16), and then finishes the operation.

In Process T17, the control section 50 causes the display 42 to display an appropriate character string, such as "Finish?" or the like, and stands by until the user makes a response to finish/not finish the e-mail system. When the user selects to finish the e-mail system by operating the key operation section 41 in a specific way, the control section 50 finishes the series of operation. On the other hand, when the user selects not to finish the e-mail system, the foregoing flow is repeated from Process T19.

It should be noted that, in the foregoing explanation, the mobile phone 1 is used as a network connecting device; however the present invention is not limited to this. The present invention is applicable for devices which can send and receive data via network, such as mobile phone, video phone, mobile broadcasting terminal, Internet TV, cable TV, personal computer etc.

Further, it should be noted that, in the foregoing explanation, the mobile phone 1 is used as a network connecting device, and therefore the display capable of receiving a display signal from the network connecting device is provided in the mobile phone 1; however, the network connecting device according to the present invention does not necessarily have to have a display. More specifically, the network connecting device may be a desktop-type personal computer or the like which transmits a display signal to an external display device.

Further, in the foregoing explanation, the mobile phone 1 performs data communication with another network connecting device via a carrier network; however, the present invention is not limited to this. The present invention is applicable for various network connecting devices carrying out data communication with another terminal device via, for example, the Internet, Intranet, Extranet, LAN, ISDN, VAN, CATV communication network, virtual private network, telecommunication network, mobile body communication network, satellite communication network etc.

Furthermore, in the foregoing explanation, the mobile phone 1 serving as the network terminal device has a function of receiving ground-based broadcast; however, the present invention is not limited to this, but is applicable for various network connecting devices which reproduces programs of different broadcast modes, such as satellite broadcast, digitalized terrestrial broadcast, CATV, the Internet broadcast, contents-delivery through a carrier network etc.

Second Embodiment

In the following, another embodiment of the present invention is described with reference to FIGS. 28 and 29.

Major differences between the present embodiment and the first embodiment are that the process of extracting a keyword(s) from the EPG data is carried out by an EPG analyzing server 100 (server device), and a mobile phone 200 (terminal device) acquires the keyword(s) from the EPG analyzing server. The EPG analyzing server 100 and the mobile phone 1 are connected to each other via a carrier network, so as to carry out data communication therebetween.

A feature of the EPG analyzing server 100 is its control section. Moreover, only one difference between the mobile phone 200 and the mobile phone 1 is their control sections. Therefore, the following explains the control sections of the EPG analyzing server 100 and the mobile phone 200.

Figure 28:
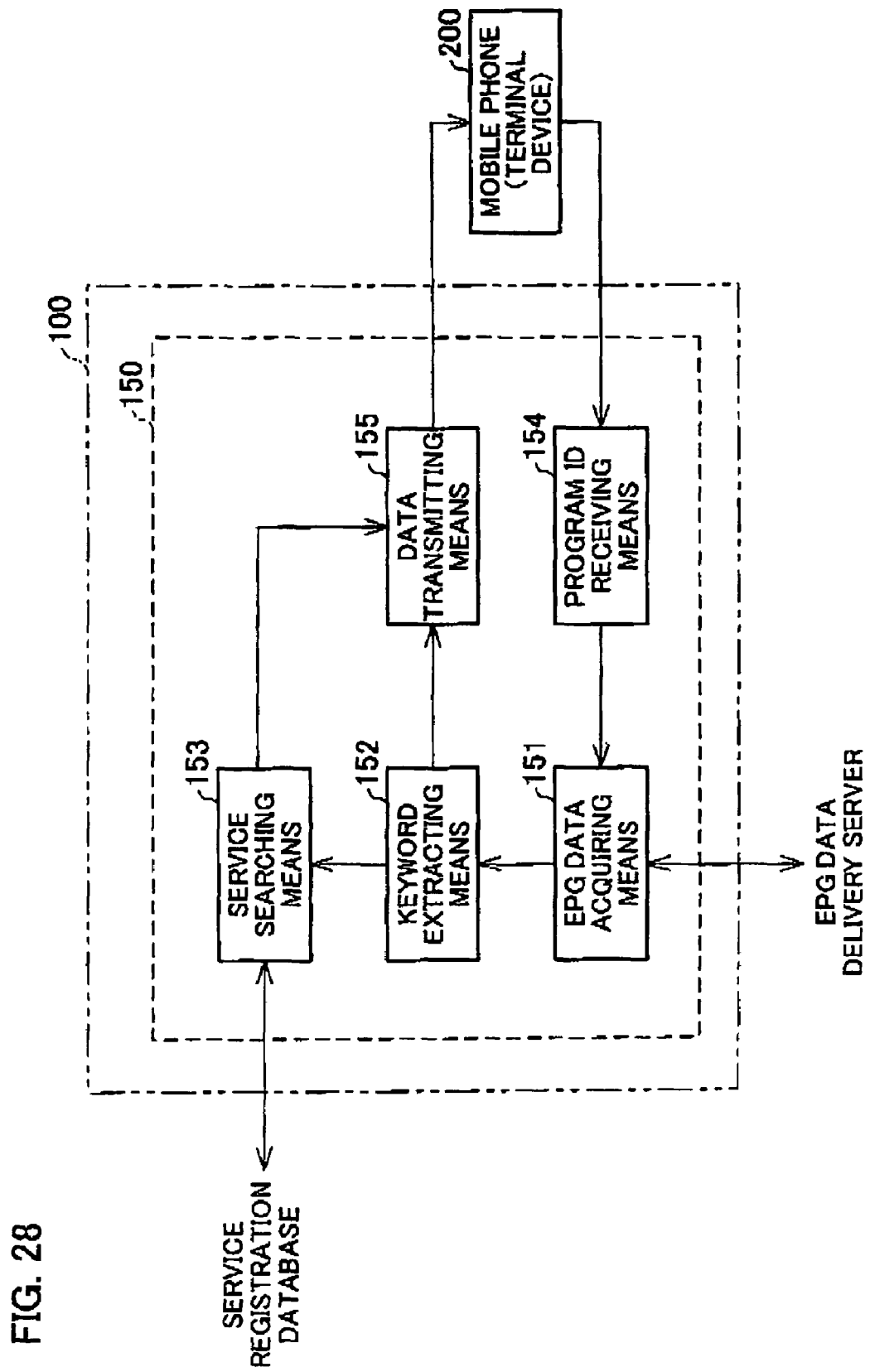
FIG. 28 is a block diagram illustrating a structure of a control section in an EPG analyzing server.

First, a control section 150 of the EPG analyzing server 100 is explained in reference to FIG. 28. The control section 150 includes an EPG data acquiring means 151 (program information acquiring means), a keyword extracting means 152, a service searching means 153 (searching means), a program ID receiving means 154 and a data transmitting means 155.

The program ID receiving means 154 receives a program ID from the mobile phone 200 via the carrier network. Here, the program ID is unique information that is allocated for each program, and the program ID is expressed by, for example, a numerical value. The mobile phone 200 is so arranged as to be able to extract the program ID of a currently-running program from the received broadcast wave. Then, the mobile phone 200 transmits a keyword acquire request or a search result acquire request, and the program ID to the EPG analyzing server 100, as described later. With this, the EPG analyzing server 100 can uniquely specify the program currently received in the mobile phone 200. Note that the program ID is used here as the program specifying information for specifying the program currently received in the mobile phone 200, however the present invention is not limited to this, and the program ID receiving means 154 may be so arranged as to receive another program specifying information, for example, information about a channel, etc. of a program currently received in the mobile phone 200.

The EPG data acquiring means 151 is so arranged as to acquire the EPG data regarding a program currently received in the mobile phone 200. Specifically, the EPG data acquiring means 151 transmits the acquired program ID to an EPG data delivery server via the carrier network, and acquires the EPG data regarding a program specified by the program ID. Note that only the function of acquiring the EPG data regarding the program currently received in the mobile phone 200 is required for the EPG data acquiring means 151.

The keyword extracting means 152 acquires the EPG data from the EPG data acquiring means 151 so as to extract the keyword(s) from the acquired EPG data. Here, the keyword extracted by the keyword extracting means 152 is a character string obtained by dividing character strings contained in the EPG data. The process carried out by the keyword extracting means 152 to extract the keyword(s) is similar to the process carried out by the keyword extracting means 52 of the mobile phone 1, and the explanation thereof is omitted here. Note that the EPG data used by the keyword extracting means 152 to extract the keyword(s) is the EPG data regarding a program received in the mobile phone 200. Therefore, the keyword(s) regarding the program currently received in the mobile phone 200 is obtained in the EPG analyzing server 100.

The service searching means 153 is so arranged as to search for a message exchange service related to the program which has been received in the mobile phone 200. The service searching means 153 acquires the keyword(s) extracted by the keyword extracting means 151. Then, the service searching means 153 transmits the acquired keyword(s) to a predetermined service registration database connected to the carrier network, and then acquires an address(es) and title(s) associated with the keyword(s). That is, the service searching means 153 uses the keyword(s) extracted by the keyword extracting means 152, so as to search for a message exchange system associated with the keyword(s). The service searching means 153 can both receive the keyword(s) directly from the keyword extracting means 152 and read out the keyword(s) stored in a storage section 160 by the keyword extracting means 152.

Note that the service registration database is a database connected to the carrier network, and it is only required to have data of keyword(s), each of which is associated with an address indicating location of data for causing the mobile phone 200 to function as a terminal device for the message exchange system, and the title of the message exchange system. Further, according to FIG. 28, the service registration database is provided outside the EPG analyzing server 100; however, it may be arranged so that the service registration database is contained in the EPG analyzing server 100.

A data transmitting means 155 is so arranged as to transmit to the mobile phone 200 the keyword(s) extracted by the keyword extracting means and the title(s) and address(es), acquired by the service searching means, of the message exchange system(s). In the case of receiving the keyword acquiring request from the mobile phone 200, the data transmitting means 155 transmits to the mobile phone 200 the keyword(s) extracted by the keyword extracting means. Meanwhile, in the case of receiving the search result acquiring request from the mobile phone 200, the data transmitting means 155 transmits to the mobile phone 200 the title(s) and address(es), acquired by the service searching means 153, of the message exchange system(s).

The following explains the mobile phone 200. The mobile phone 200 is identical to the mobile phone 1 shown in FIG. 1 except for the control section 50. A control section 250 of the mobile phone terminal 200 is explained in reference to FIG. 29. FIG. 29 is a block diagram showing a structure of the control section 250. Note that as with the control section 50 of the mobile phone 1, the control section 250 has a function of downloading a program code from another network device via the carrier network so as to execute a command of the program code. Moreover, as with the control section 50 of the mobile phone 1, the control section 250 also has a function of downloading an HTML document from another network device via the carrier network so as to reform and display the HTML document. With these functions, the mobile phone 200 serves as a terminal of a message exchange system, such as a chat or a blog. However, in a network connecting device (e.g., mobile phone), the structure for realizing these functions is conventionally well-known, and therefore the explanation thereof is omitted here.

Figure 29:
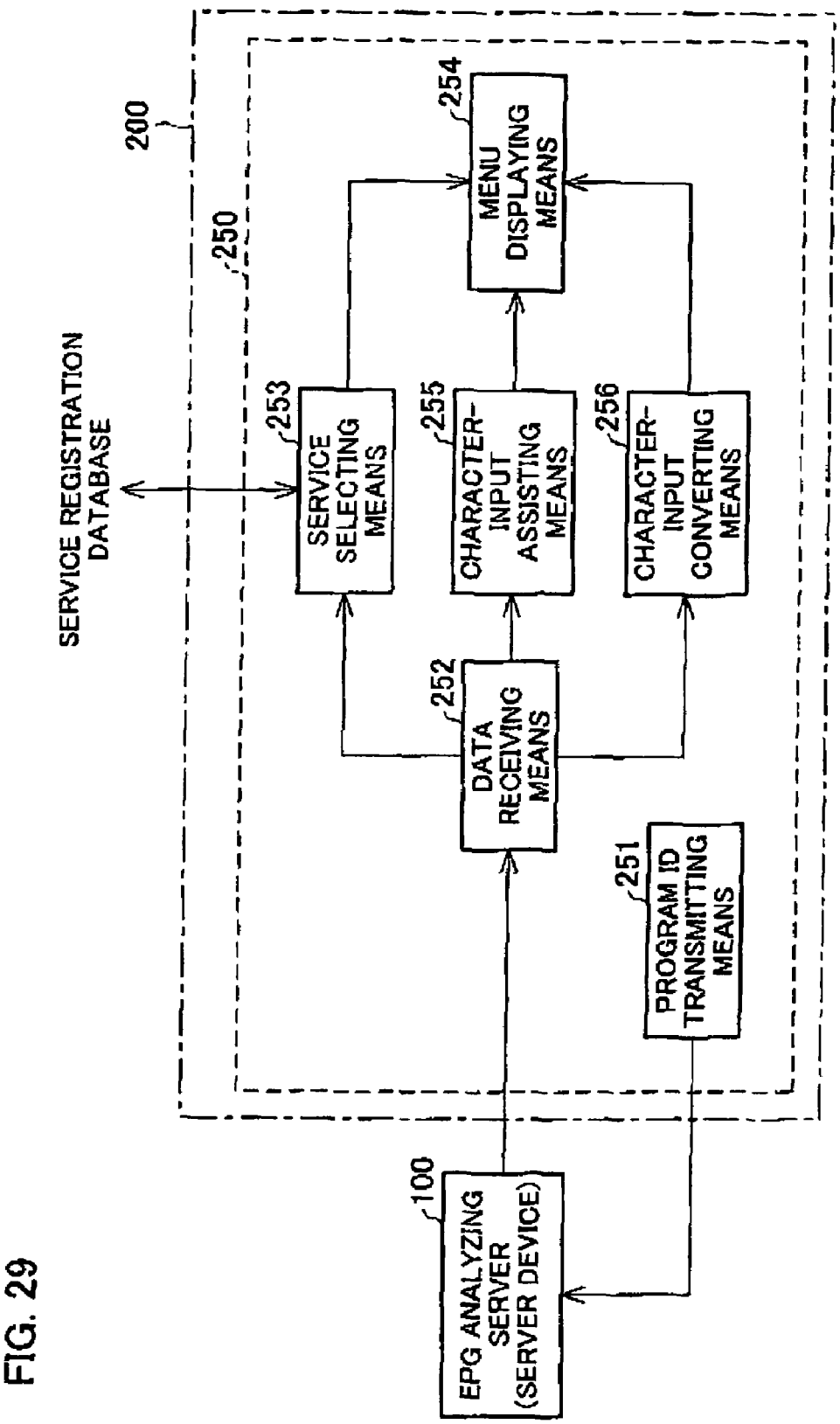
FIG. 29 is a block diagram illustrating a structure of a control section in another mobile phone of the present invention.

As shown in FIG. 29, the control section 250 includes a program ID transmitting means 251, a data receiving means 252, a service selecting means 253 (selecting means), menu displaying means 254 (displaying means), a character-input assisting means 255 (character inputting means) and a character-input converting means 256.

The program ID transmitting means 251 transmits the keyword acquiring request or the search result acquire request, and the program ID of a program currently running, to the EPG analyzing server 100. The program ID transmitting means 251 extracts the program ID of a program currently received, the program ID being superimposed on the broadcast wave. Then, the program ID transmitting means 251 transmits the extracted program ID to the EPG analyzing server 100. Moreover, the data receiving means 251 transmits to the EPG analyzing server (i) the search result acquire request with respect to a data acquire request from the service selecting means 253 and (ii) the keyword acquire request with respect to a data acquire request from the character-input assisting means 255 and the character-input converting means 256.

Note that, the program ID transmitted by the program ID transmitting means 251 is only required to serve as information for specifying a program currently received in the mobile phone 200. For example, the program ID may be received channel, area information, or EPG data itself.

The data receiving means 252 is so arranged as to receive data transmitted from the EPG analyzing server 100. The data receiving means 252 can send back data, acquired from the EPG analyzing server 100, to the service selecting means 253, the character-input assisting means 255 and the character-input converting means 256 each of which has transmitted the data acquire request. Moreover, the data acquired from the EPG analyzing server can be stored in a specific storage section (not shown).

The following explains the service selecting means 253. The service selecting means 253 is so arranged as to select the message exchange service related to the program which she/he has been watching. When the user carries out a predetermined operation to start using the message exchange service, the service selecting means 253 transmits the data acquire request to the program ID transmitting means 251. The program ID transmitting means 251 receives the data acquire request, and then transmits to the EPG analyzing server 100 the search result acquire request and the program ID of the program currently running. The EPG analyzing server 100 refers to the received program ID, extracts the keyword(s) regarding the program from the EPG data regarding the program currently received in the mobile phone 200, and searches for the message exchange service by using the extracted keyword(s). Then, the EPG analyzing server 100 transmits a search result(s) by using the data transmitting means 155.

The transmitted search result(s) is received by the service selecting means 253 via the data receiving means 252. Here, the search result(s) is the title(s) and address(es) of the message exchange system(s) related to the program which has been received in the mobile phone 200. The service selecting means 253 transmits the title(s) to the menu displaying means 254 and stores the address(es) in the storage section (not shown).

The menu displaying means 254 causes a predetermined display (not shown) to display a list of the titles of the services received from the service selecting means 253. This allows the user to visually confirm a list of services, thereby selecting arbitrary one(s).

The following explains the character-input assisting means 255. The character-input assisting means 255 is so arranged as to allow the user to easily input a message related to the program that he/she has been watching.

In the case in which a predetermined step of accepting the user's input of characters is required in a series of steps which are instructed by the user to be started, the control section 250 causes the character-input assisting means 255 to carry out the step.

First, the character-input assisting means 255 transmits the data acquire request to the program ID transmitting means 251. The program ID transmitting means 251 receives the data acquire request, and then transmits to the EPG analyzing server 100 the keyword acquire request and the program ID of the program currently running. The EPG analyzing server 100 refers to the received program ID, extracts the keyword(s) regarding the program from the EPG data regarding the program currently received in the mobile phone 200, and transmits the extracted keyword(s) by using the data transmitting means 155.

The transmitted keyword(s) is received by the character-input assisting means 255 via the data receiving means 252. Here, the received keyword(s) is a keyword(s) related to the program which has been received in the mobile phone 200. The character-input assisting means 255 transmits the title(s) to the menu displaying means 254.

Then, the menu displaying means 254 causes a predetermined display to display a list of the received keywords. The user selects one of the keywords displayed on the predetermined display, and then the character-input assisting means 255 accepts the selected keyword as the user's input. With this, the user can easily input a character string regarding the program which he/she has been watching.

The following explains the character-input converting means 256. The character-input converting means 256 is so arranged as to cooperate with a predictive text entry dictionary section 257 to convert a character string inputted by the user into a character string associated in advance with the character string inputted by the user. Basic functions of the character-input converting means 256 and the predictive text entry dictionary section 257 are similar to the basic functions of the character-input converting means 56 and predictive text entry dictionary section 57 of the mobile phone 1, and further explanations thereof are omitted here.

The character-input converting means 256 is the same in basic function as the character-input converting means 56. It works with the predictive text entry dictionary section 257 to perform predictive text entry and Hiragana/Katakana to Kanji conversion, and also carries out a process of adding the keyword(s), acquired from the data receiving means 252, to the predictive text entry dictionary section 257. Details of the process of adding the keyword(s) into the dictionary here is similar to those of the character-input converting means 56, and the explanation thereof is omitted here.

Thus, because the character-input converting means 256 carries out the process of adding the keyword(s) to the Hiragana/Katakana/Kanji conversion dictionary, the user can easily input to the mobile phone 200 the message regarding the program which has been watched.

The EPG analyzing server 100 and the mobile phone 200 are connected to each other via a network, so that it is possible by the mobile phone 200 to easily find the message exchange service related to the program which has been watched. In addition, it is possible to arrange a network system which allows the user to easily input the message when using the message exchange system.

Note that each block of the mobile phone 1, EPG analyzing server 100 and mobile phone 200 can be constituted by a hardware logic, or can be realized by a CPU (Central Processing Unit) and a software.

That is, each of the above devices includes: a CPU for executing a command of a control program for realizing each function; a ROM (Read Only Memory) which stores the control program; a RAM (Random Access Memory) which develops the control program to obtain an executable control program; and a storage section (recording medium), such as a memory, for storing the control program and various data.

With this, the object of the present invention can be achieved by a predetermined recording medium. The recording medium has only to record in a computer-readable manner a program code (executable format program, intermediate code program, source program) of the control program of the character-input converting device 1, the control program being software that realizes the above-described functions. By supplying the recording medium to the character-input converting device 1, the character-input converting device 1 (, CPU or MPU) as a computer has only to read out the program code recorded in the supplied recording medium, and then execute the program code.

The recording medium for supplying the program code to each of the above devices is not limited to a recording medium having a specific structure or a specific type of recording medium. That is, the recording medium is exemplified by (i) a tape, such as a magnetic tape or a cassette tape, (ii) a disc, such as a magnetic disc (a floppy® disc, a hard disc, etc.) or an optical disc (a CD-ROM, an MO, an MD, a DVD, a CD-R, etc.), (iii) a card, such as an IC card (including a memory card) or an optical card, (iv) a semiconductor memory, such as a mask ROM, an EPROM, an EEPROM, a flash ROM, etc.

Moreover, the object of the present invention can be achieved by arranging each of the above devices to be connectable with a communication network. In this case, the program code is supplied to each device via the communication network. The communication network is not limited to a specific type or form of communication network, as long as the communication network can supply the program code to the character-input converting device 1. The communication network is, for example, the Internet, an intranet, an extranet, a LAN, an ISDN, a VAN, a CATV communication network, a virtual private network, a telephone network, a mobile communication network, a satellite communication network, or the like.

Moreover, a transmission medium constituting the communication network is not limited to a transmission medium having a specific structure or a specific type of transmission medium, as long as the transmission medium can transmit the program code. The transmission medium is, for example, (i) a fixed line, such as an IEEE1394, a USB (Universal Serial Bus), a power line carrier, a cable TV circuit, a telephone line or an ADSL (Asymmetric Digital Subscriber Line), or (ii) a wireless, such as an infrared (an IrDA, a remote control), a Bluetooth®, an 802.11 wireless, an HDR, a mobile phone network, a satellite circuit or a ground wave digital network. Note that the present invention can be realized even in the case in which the program code is in the form of a computer data signal which is realized by an electronic transmission and incorporated in a carrier wave.

A network connecting device of the present invention is arranged so that the searching means stores each address in a predetermined storage section with a frequency of acquisition, and the displaying means displays said one or more titles of the message exchange system in the display in a descending order of the frequency stored in the storage section.

According to the above arrangement, the titles of the message exchange systems regarding the program reproduced in the network connecting device are displayed for a user in the form of a list in order of the number of times the message exchange system is used. Therefore, the user can more easily use a frequently used message system.

A network connecting device according to the present invention is arranged so that the dictionary database includes a plurality of storage regions, and the input character converting means stores said one or more keywords in a specific storage region among the plurality of storage regions.

According to the above arrangement, the keyword(s) extracted from the program information of the program reproduced and the other keywords can be handled separately.

A network connecting device according to the present invention is arranged so that the display means displays the keywords stored in the specific region before terms stored in other storage region.

According to the above arrangement, the keyword(s) extracted from the program information of the program reproduced are displayed as a selection option before other term(s). Therefore, the user can easily select the keyword(s) regarding the program reproduced.

A network connecting device according to the present invention is arranged so that when a new keyword is acquired, the input character converting means stores the new keyword as a replacement of a previously-stored keyword.

According to the above arrangement, only the keyword(s) extracted from the program information regarding the recently reproduced program is stored in the specific storage region. Therefore, for the user who intends to input the keyword(s) regarding the recently reproduced program, it is possible to avoid disturbing a selection of the term(s) by displaying the keyword(s) regarding the program reproduced before.

A network connecting device according to the present invention is arranged so that said one or more keywords acquired by the keyword extracting means is one or more character strings, each obtained by dividing a character string contained in the program information at a certain character.

According to the above arrangement, the keyword(s) regarding the program reproduced can be efficiently extracted from the program information in accordance with a certain rule determined by how the predetermined character is determined.

A network connecting device according to the present invention is arranged so that said one or more keywords acquired by the keyword extracting means is one or more character strings, each obtained by dividing a character string contained in the program information at a certain character, and further dividing the character string by type of character.

In the above arrangement, types of characters are, for example, kanji, hiragana, katakana, alphabets, numbers, etc., and alphabets are further distinguished by respective national languages. According to the above arrangement, the keyword(s) regarding the program reproduced are divided in accordance with a predetermined character(s) and the type of the character(s). Therefore, it is possible to extract the keyword(s) having a preferable length for utilizing searching or inputting.

A network connecting device according to the present invention further comprises a dictionary database for storing a plurality of terms, and is arranged so that the keyword extracting means extracts a keyword identical to one of the terms stored in the dictionary database, from a character string obtained by dividing a character string contained in the program information at a certain character, the keyword extracting means selects a keyword having a largest number of characters when the character string obtained by dividing a character string contained in the program information at a certain character includes a plurality of terms identical to the terms stored in the dictionary database.

With this arrangement, it becomes possible to extract a term(s) matched with registered terms in the dictionary data base, from the character string contained in the program information. This allows extraction of a suitable keyword(s), which can be used for character input by the user or for search for message exchange service. More specifically, it becomes possible to perform the keyword extraction with high accuracy by using a dictionary database, such as a Hiragana/Katakana to Kanji conversion dictionary or a predictive text entry dictionary.

A terminal device according to the present invention is connected to a network to which the foregoing server device is connected, and capable of reproducing a program delivered to a plurality of users, the terminal device comprising: program ID transmitting means for transmitting a program ID for specifying a program reproduced in the terminal device; data receiving means for receiving one or more titles and corresponding addresses of message exchange system transmitted from the server device; displaying means for displaying a list of said one or more titles in a display which is capable of receiving a display signal from the terminal device; and selecting means for receiving data indicated by an address acquired with a title selected by the user among the list of said one or more titles.

According to the above arrangement, as with the effect obtained by the above-explained network connecting device of the present invention, it is possible to obtain an effect in which the user can easily use, by a smaller number of steps, the message exchange system regarding the program reproduced with respect to the network connecting device. In addition, a system having the same effect can be constituted by the server device and the terminal device.

A terminal device according to the present invention is connected to a network to which the foregoing server device is connected, and capable of reproducing a program delivered to a plurality of users, the terminal device comprising: program ID transmitting means for transmitting a program ID for specifying a program reproduced in the terminal device; data receiving means for receiving one or more keywords from the server device; displaying means for displaying a list of said one or more keywords in a display which is capable of receiving a display signal from the terminal device; and character inputting means for receiving a keyword selected by the user among the list of keywords displayed in the display section as an input character string given by the user.

According to the above arrangement, as with the effect obtained by the above-explained network connecting device of the present invention, it is possible to obtain an effect in which the user can easily input, by a smaller number of steps, the keyword(s) regarding the receiving program. In addition, a system having the same effect can be constituted by the server device and the terminal device.

A terminal device according to the present invention is connected to a network to which the foregoing server device is connected, and capable of reproducing a program delivered to a plurality of users, the terminal device comprising: program ID transmitting means for transmitting a program ID for specifying a program reproduced in the terminal device; data receiving means for receiving one or more keywords from the server device; a dictionary database for storing a plurality of terms respectively associated with different character strings; displaying means for displaying, when the user inputs a character string including at least one character, all terms associated with the character string in the dictionary database, in a display capable of receiving a display signal from the terminal device; and input character converting means for receiving a term selected by the user among the terms displayed in the display section as an input character string given by the user, wherein: the input character converting means stores said one or more keywords in the dictionary database, the keywords being respectively associated with the different character strings in the dictionary database.

According to the above arrangement, as with the effect obtained by the above-explained network connecting device of the present invention, it is possible to obtain an effect in which the user can easily input, by a smaller number of steps, the keyword(s) regarding the receiving program. In addition, a system having the same effect can be constituted by the server device and the terminal device.

Note that, the present invention also includes a program for causing a computer to serve as the respective means of the network connecting device of the present invention, a program for causing a computer to serve as the respective means of the server device of the present invention, a program for causing a computer to serve as the respective means of the terminal device of the present invention, and computer-readable storage mediums for storing these programs.

The present invention is not limited to the description of the embodiments above, but may be altered by a skilled person within the scope of the claims. An embodiment based on a proper combination of technical means disclosed in different embodiments is encompassed in the technical scope of the present invention.

The present invention is suitable for a network connecting device capable of receiving TV broadcast, such as a mobile phone with a TV function.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A network connecting device connected to a network and capable of reproducing a program delivered to a plurality of users, the network connecting device, comprising:
a program information acquirer acquiring program information regarding a program reproduced in the network connecting device;
a keyword extractor extracting one or more keywords from the program information;
a searcher searching and acquiring one or more of titles and addresses related to at least one of said one or more keywords from a database on the network, which database previously stores titles and corresponding addresses, each title and a corresponding address are related to one or more keywords and given to a certain message exchange system, the address indicating location of data for causing the network connecting device to function as a terminal device for the message exchange system; and a display displaying a list of said one or more titles acquired from the database in the display which is capable of receiving a display signal from the network connecting device, the searcher receiving data indicated by an address of a title selected by the user among the list of said one or more titles, wherein the user accesses the message exchange system where a message exchange is carried out based on the title selected by the user.

2. A network connecting device as set form in claim 1, wherein:
the searcher stores each address in a predetermined storage section with a frequency of acquisition, and
the display displays said one or more titles of the message exchange system in the display in a descending order of the frequency stored in the storage section.

3. The network connecting device as set forth in claim 1, wherein:
said one or more keywords acquired by the keyword extractor is one or more character strings, each obtained by dividing a character string contained in the program information at a certain character.

4. The network connecting device as set forth in claim 1, wherein:
said one or more keywords acquired by the keyword extractor is one or more character strings, each obtained by dividing a character string contained in the program information at a certain character, and further dividing the character string by type of character.

5. A program for causing a computer to function as the network connecting device according to claim 1, wherein the program causes a computer to function as respective device of the network connecting device.

6. A computer-readable storage medium, which stores a program for causing a computer to function as the network connecting device according to claim 1, wherein the program causes a computer to function as respective device of the network connecting device.

7. A network connecting device connected to a network and capable of reproducing a program delivered to a plurality of users,
the network connecting device, comprising:
a program information acquirer acquiring program information regarding a program reproduced in the network connecting device;
a keyword extractor extracting one or more keywords from the program information;
a searcher searching and acquiring one or more of titles and addresses related to at least one of said one or more keywords from a database on the network, which database previously stores titles and corresponding addresses, each title and a corresponding address are related to one or more keywords and given to a certain message exchange system, the address indicating location of data for causing the network connecting device to function as a terminal device for the message exchange system;

a display displaying a list of said one or more titles acquired from the database in the display which is capable of receiving a display signal from the network connecting device, the searcher receiving data indicated by an address of a title selected by the user among the list of said one or more titles, a dictionary database for storing a plurality of terms wherein:

the keyword extractor extracts a keyword identical to one of the terms stored in the dictionary database, from a character string obtained by dividing a character string contained in the program information at a certain character, the keyword extractor selects a keyword having a largest number of characters when the character string obtained by dividing a character string contained in the program information at a certain character includes a plurality of terms identical to the terms stored in the dictionary database.

8. A reception method for receiving data for causing a network connecting device to function as a terminal device of a message exchange system related to a program reproduced in the network connecting device, the network connecting device being connected to a network and capable of reproducing a program delivered to a plurality of users,
the reception method comprising the steps of:
(i) acquiring program information regarding the program reproduced in the network connecting device;
(ii) extracting one or more keywords from the program information;
(iii) searching/acquiring one or more of titles and addresses related to at least one of said one or more keywords from a database on the network, which database previously stores titles and corresponding addresses, each title and a corresponding address are related to one or more keywords and given to a certain message exchange system, the address indicating location of data for causing the network connecting device to function as a terminal device for the message exchange system;
(iv) displaying a list of said one or more titles acquired from the database in a display which is capable of receiving a display signal from the network connecting device; and
(v) receiving data indicated by an address of a title selected by the user among the list of said one or more titles, wherein
the user accesses the message exchange system where a message exchange is carried out based on the title selected by the user.

9. The reception method according to claim 8, further comprising the steps
(vi) storing a plurality of terms
(vii) extracts a keyword identical to one of the terms stored in the dictionary database, from a character string obtained by dividing a character string contained in the program information at a certain character, selects a keyword having a largest number of characters when the character string obtained by dividing a character string contained in the program information at a certain character includes a plurality of terms identical to the terms stored in the dictionary database.

* * * * *